(12) United States Patent
Crisan et al.

(10) Patent No.: US 8,914,807 B2
(45) Date of Patent: Dec. 16, 2014

(54) METHOD, SYSTEM, AND PROGRAM FOR GENERATING A PROGRAM CAPABLE OF INVOKING A FLOW OF OPERATIONS

(75) Inventors: Valer-Alin Crisan, San Jose, CA (US); Cynthia Maro Saracco, San Jose, CA (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2110 days.

(21) Appl. No.: 10/407,536

(22) Filed: Apr. 3, 2003

(65) Prior Publication Data

US 2003/0191769 A1    Oct. 9, 2003

Related U.S. Application Data

(63) Continuation-in-part of application No. 09/968,353, filed on Sep. 28, 2001.

(51) Int. Cl.

| G06F 3/00 | (2006.01) |
|---|---|
| G06F 13/00 | (2006.01) |
| G06F 9/44 | (2006.01) |
| G06F 9/46 | (2006.01) |
| G06F 17/30 | (2006.01) |

(52) U.S. Cl.
CPC ................................. *G06F 17/30483* (2013.01)
USPC .......................................... 719/313; 707/600

(58) Field of Classification Search
USPC ......... 719/310, 320, 311, 313, 318, 328, 330, 719/331, 315; 709/203; 718/1, 101, 106; 707/10, 104.1
See application file for complete search history.

(56) References Cited

U.S. PATENT DOCUMENTS

| 5,504,886 | A |   | 4/1996  | Chang et al. |
|---|---|---|---|---|
| 5,634,127 | A | * | 5/1997  | Cloud et al. ................. 719/313 |
| 5,689,698 | A |   | 11/1997 | Jones et al. |
| 5,826,239 | A | * | 10/1998 | Du et al. .......................... 705/8 |
| 5,884,312 | A |   | 3/1999  | Dustan et al. |
| 5,956,483 | A |   | 9/1999  | Grate et al. |
| 5,960,420 | A | * | 9/1999  | Leymann et al. ................ 707/1 |
| 6,003,011 | A | * | 12/1999 | Sarin et al. ...................... 705/9 |
| 6,006,235 | A | * | 12/1999 | Macdonald et al. ...... 707/103 R |

(Continued)

OTHER PUBLICATIONS

Silberschatz, Avi, Peter Galvin and Greg Gagne; "Applied Operating System Concepts," First Edition, John Wiley & Sons, Inc., 2000; pp. 507-515 and 745-751.*

(Continued)

*Primary Examiner* — Diem Cao
(74) *Attorney, Agent, or Firm* — David W. Victor; Konrad, Raynes, Davda & Victor LLP

(57) ABSTRACT

Provided are a method, system, and program for generating a program capable of invoking a flow of operations, wherein the program is capable of being initiated from an external call. A definition file defining a flow of operations and mapping information defining input parameters to the flow of operations are received. The received definition file and mapping information are processed to generate program statements within the program that when executed perform: setting input parameters to the flow of operations to values received from an external call to the program; invoking the flow of operations with the input parameters including values from the external call; and receiving output from the flow of operations and extracting at least one value from the received output to return to the external call.

40 Claims, 17 Drawing Sheets

(56) References Cited

U.S. PATENT DOCUMENTS

| | | | |
|---|---|---|---|
| 6,012,067 A | 1/2000 | Sarkar | |
| 6,029,163 A | 2/2000 | Ziauddin | |
| 6,058,393 A | 5/2000 | Meier et al. | |
| 6,067,542 A | 5/2000 | Carino, Jr. | |
| 6,094,649 A | 7/2000 | Bowen et al. | |
| 6,317,786 B1 | 11/2001 | Yamane et al. | |
| 6,324,683 B1 | 11/2001 | Fuh et al. | |
| 6,338,056 B1 | 1/2002 | Dessloch et al. | |
| 6,418,448 B1 * | 7/2002 | Sarkar | 707/104.1 |
| 6,434,619 B1 | 8/2002 | Lim et al. | |
| 6,457,066 B1 | 9/2002 | Mein et al. | |
| 6,460,041 B2 | 10/2002 | Lloyd | |
| 6,560,633 B1 | 5/2003 | Roberts et al. | |
| 6,574,673 B1 * | 6/2003 | Hari et al. | 719/310 |
| 6,591,295 B1 | 7/2003 | Diamond et al. | |
| 6,732,089 B1 | 5/2004 | Sinn | |
| 6,741,997 B1 | 5/2004 | Liu et al. | |
| 6,745,332 B1 | 6/2004 | Wong et al. | |
| 6,792,605 B1 * | 9/2004 | Roberts et al. | 719/313 |
| 6,820,267 B2 * | 11/2004 | Christensen et al. | 719/315 |
| 6,910,070 B1 | 6/2005 | Mishra et al. | |
| 6,910,216 B2 | 6/2005 | Abileah et al. | |
| 6,961,760 B2 | 11/2005 | Li et al. | |
| 6,978,261 B2 | 12/2005 | Cotner et al. | |
| 6,985,939 B2 | 1/2006 | Fletcher et al. | |
| 6,996,574 B2 | 2/2006 | Gluckman | |
| 7,103,590 B1 | 9/2006 | Murthy et al. | |
| 7,107,597 B2 | 9/2006 | Shappir et al. | |
| 7,120,703 B2 | 10/2006 | Li et al. | |
| 7,155,426 B2 | 12/2006 | Al-Azzawe | |
| 7,165,113 B2 | 1/2007 | Karp et al. | |
| 2002/0016814 A1 | 2/2002 | Convent et al. | |
| 2002/0038450 A1 | 3/2002 | Kloppmann et al. | |
| 2002/0073089 A1 | 6/2002 | Schwartz et al. | |
| 2002/0120685 A1 | 8/2002 | Srivastava et al. | |
| 2002/0120704 A1 * | 8/2002 | Karp et al. | 709/207 |
| 2002/0143819 A1 | 10/2002 | Han et al. | |
| 2002/0156688 A1 | 10/2002 | Horn et al. | |
| 2002/0184219 A1 | 12/2002 | Preisig et al. | |
| 2002/0188761 A1 | 12/2002 | Chikirivao et al. | |
| 2003/0004746 A1 | 1/2003 | Kheirolomoom et al. | |
| 2003/0061404 A1 | 3/2003 | Atwal et al. | |
| 2003/0093436 A1 | 5/2003 | Brown et al. | |
| 2003/0126109 A1 | 7/2003 | Couch et al. | |
| 2004/0199636 A1 | 10/2004 | Brown et al. | |
| 2004/0205772 A1 | 10/2004 | Uszok et al. | |
| 2004/0213409 A1 | 10/2004 | Murto et al. | |
| 2005/0093881 A1 * | 5/2005 | Okita et al. | 345/589 |

OTHER PUBLICATIONS

"Workflow Management Facility Convenience Document combining dtc/99-07-05 dtc/2000-02-03 (WF RTF 1.3 Report)," OMG Doc #: dtc/2000-02-05, Feb. 14, 2000.*
"Workflow Management Coalition Interface 1: Process Definition Interchange Process Model," Doc #: WfMC TC-1016-P, version 1.1, The Workflow Management Coalition, Oct. 29, 1999.*
"Workflow Management Application Programming Interface (Interface 2&3) Specification," Doc #: WFMC-TC-1009, version 2.0, The Workflow Management Coalition, Jul. 1998.*
Jaworski, Jamie, "JAVA 1.1 Developer's Guide," Second Edition, Sams.net Publishing, 1997; pp. 385-403.*
IBM Corp. DB2 XML Extender, p. 1 [online]. Retrieved from IBM Software: Database and Data Management . . . .
IBM Corp. The Web Services Insider, Part 4: Introducing the Web Services Flow Language, pp. 1-7 [online]. Retrieved from http://www-106.ibm.com/deevloperworks/library/ws-ref4/index.html.
Accenture, Ariba., Inc., et al. UDDI Version 2.0 Data Structure Reference. UDDI Open Draft Specification Jun. 8, 2001, pp. 1-37 [online]. Retireved from http:www.uddi.org/pubs/DataStructure-V2.00-Open-20010608.pdf.
Accenture, Ariba., Inc., et al. Using WSDL in a UDDI Registry 1.05. UDDI Working Draft Best Practices Document, Jun. 25, 2001, pp. 1-9 [online]. Retrieved from http:www.uddi.org/pubs/wsdlbestpractices-V1.05-Open-20010625.pdf.
Accenture Ariba, Inc., et al. UDDI Veresion 2.0 API Specification. UDDI Open Draft Specification, Jun. 8, 2001, pp. 1-81 [online]. Retrieved from http:www.uddi.org/pubs/ProgrammersAPI-V2.00-Open-20010608.pdf.
W3C® (MIT, INRIA, Keio). SOAP Version 1.2. W3C Working Draft, Jul. 9, 2001, pp. 1-62 [online] [retrieved on Apr. 1, 2003]. Retrieved from http:www.w3org./TR/2001/WD-soap12-20010709/.
W3C® (MIT, INRIA, Keio). SOAP Version 1.2. Part 1:L Messaging Framework. W3C Candidate Recommendation, Dec. 19, 2002 pp. 1-44 [online] [retrieved on Apr. 1, 2003]. Retrieved from http:www.w3org./TR/2002/CR-soap12-part1-20021219.
Ariba, et al. Web Services Description Language (WSDL) 1.1, W3C Note, Mar. 15, 2001, pp. 1-49 [online] [retrieved on Apr. 1, 2003].
IBM, Corp. Web Services Flow Language (WSFL 1.0) by Prof. Dr. Frank Leymann, May 2001, pp. 1-108 [online] [retrieved on Apr. 1, 2003].
Grundgeiger, D., A. Goldade, & V. Fugman, "SQL and XML: Use XML to Invoke and Return Stored Procedures Over the Web", [online], (Aug. 2001), [retrieved on Jan. 15, 2007], Retrieved from the Internet at <URL: http:// msdn.microsoft.com/msdnmag/issues/01/08/XMLSQL/printasp>, 17 pp.
IBM Corporation, "DB2 XML Extender", [online], Jun. 19, 2001, [Retrieved on Mar. 1, 2007], retrieved from the Internet at <URL: http://www-4.ibm.com/software/data/db2/extenders/xmlext/>.
Kao, J., "Developers Guide to Building XML-based Web Services with the Java 2 Platform, Enterprise Edition (J2EE)", The Middleware Company, Jun. 2001, 20 pp.
Oasis, "Simple Object Access Protocol (SOAP)", Technology Reports, [online], Jul. 2003 [retrieved on Jan. 16, 2007], Retrieved from the Internet at <URL: http://www.oasis-open.org/cover/soap.html>, 62 pp.
Ogbuji, U., "Using WSDL in SOAP Applications", [online], Nov. 1, 2000, [Retrieved on Jan. 16, 2007], retrieved from the Internet at <URL: http://www-128.ibm.com/developerworks/library/ws-soap/?dwzone=components>, 7 pp.
Rutledge, S.H. & S. Medicke, "Database Integration With DB2 Relational Connect: Building Federated Systems with Relational Connect and Database Views", 2001, 33 pp.
Sybase, Inc., "What is AI for Stored Procedures", [online], 2001, [Retrieved on Jan. 16, 2007], Retrieved from the Internet at <URL: http://awebproxyprd.ins.state.ny.us/docs/aispref/aiprocp3.htm>, 2 pp.
Workman, D.D., "A Guide for Writing Sybase Stored Procedures for the World Wide Web", [online], Mar. 29, 1998, [Retrieved on Jan. 16, 2007], Retrieved from the Internet at <URL: http://sybernet.sri.com/guide.html>, 67 pp.
Zou, Y., & K. Kontogiannis, "Web-Based Specification and Integration of Legacy Services", Proceedings of the 2000 Conference of the Centre for Advanced Studies on Collaborative Research, 2000, 17 pp.
Cheng, J. and J. Xu, "IBM DB2 XML Extender: An End-to-End Solution for Storing and Retrieving XML Documents", Proceedings of the 16th International Conference on Data Engineering, Feb. 2000, 12 pp.
Huang, L., A. Akram, D.W. Walker, R.J. Allan, O.F. Rana, and Y. Huang, "A Workflow Portal Supporting Multi-Language Interoperation and Optimisation", Concurrency and Computation: Practice and Experience, 2000, pp. 1-10.
IBM Corporation, "DB2 Universal Database XML Extender: Web-Enabling Your Data with XML", 2000, 2 pp.
Newport, B., "Requirements for Building Industrial Strength Web Services: The Service Broker", [online], Jul. 2001, [retrieved on Apr. 25, 2007], retrieved from the Internet at <URL: http://www.theserverside.com/tt/articles/content/service-broker/article.html>, 14 pp.
Snell, J., "Web Services Insider, Part 7: WSFL and Recursive Composition", [online], Jul. 1, 2001, [Retrieved on Apr. 25, 2007], retrieved from the Internet at <URL: http://www.128.ibm.com/developerworks/webservices/library/ws-ref7>, 6 pp.
Tapang, C.C., "SOAP Toolkit 2.0: New Definition Languages Expose Your COM Objects to SOAP Clients", [online], updated Dec. 17,

(56) References Cited

OTHER PUBLICATIONS

2004, [retrieved on Apr. 26, 2007], retrieved from the Internet at <URL: http://msdn.microsoft.com/msdnmag/issues/01/04/Toolkit20/print.asp>, 8 pp.

Cutlip, R., "Web Services: The New Web Paradigm", DB2 Magazine, Quarter 4, vol. 6, Iss. 4, [online], 2001, [Retrieved on Jan. 16, 2007], Retrieved from the Internet at <URL: http://www.db2mag.com/db_area/archives/2001/q4/cutlip/shtml>, 8 pp.

Kao, J., "Developer's Guide to Building XML-based Web Services with the Java 2 Platform, Enterprise Edition (J2EE)", The Middleware Company, Jun. 2001, 21 pp.

Atzenberger, B. and M. Bender, "Data Warehouse Performance Enhancements with Oracle9i", Oracle White Paper, Apr. 2000, 36 pp.

Bonifati A., S. Ceri, and S. Paraboschi, "Active Rules for XML: A New Paradigm for E-services", The VLDB Journal, vol. 10, No. 1, Aug. 2001, pp. 39-47.

Colan, M., "Dynamic E-business: Using Web Services to Transform Business", [online], Jun. 2001, [Retrieved on Oct. 8, 2007], retrieved from the Internet at <URL: http://www.cs.mu.oz.au/~eas/subjects/654/wsintro.pdf>, 15 pp.

Duftler, M.J., N.K. Mukhi, A. Slominski, and S. Weerawarana, "Web Services Invocation Framework (WSIF)", IBM, Aug. 9, 2001, pp. 1-8.

IBM Corp, "Web Services Object Runtime Framework: Implementing Web Services with XML Extender, Version 7.2 (Beta)", [online], First Edition, Jul. 2001, [Retrieved on Oct. 8, 2007], Retrieved from the Internet at <URL: http://www-306.ibm.com/software/date/db2/extenders/xmlext/docs/v72wrk/dxxservl.htm>, 61 pp.

Lambros, P., M. Schmidt, and C. Zentner, "Combine Business Process Management Technology and Business Services to Implement Complex Web Services", IBM Web Services, May 2001, pp. 1-27.

Manes, A.T., "Enabling Open, Interoperable, and Smart Web Services: The Need fro Shared Context", [online], Mar. 2001, [Retrieved on Oct. 8, 2007], retrieved from the Internet at <URL: http://www.w3.org/2001/03/WSWS-popa/paper29>, 7 pp.

Mckoi, "Mckoi SQL Database—Version History", [online], Updated Aug. 2004, [Retrieved on Oct. 11, 2007], retrieved from the Internet at <URL: http://www.mckoi.com/database/history.html>, 23 pp.

Oracle Corp, "SQL, PL/SQL, and Java", [online], Oracle9i Database Concepts, Release 1 (9.0.1), Part No. A88856-02, 2001, [retrieved on Oct. 11, 2007], retrieved from the Internet at <URL: http://download-uk.oracle.com/docs/cd/A91202_01/901_doc/server.901/a88856/c16sqlpl . . . >, 35 pp.

Price, J., "Using Static and Synamic SQL in SQLJ", [online], Aug. 9, 2001, [retrieved on Oct. 11, 2007], retrieved from the Internet at <URL: http://www.oreillynet.com/lpt/a/2068>, 8 pp.

White, W.W., "Java UDRs with Embedded SQL", [online], Jan 1, 2001, [retrieved on Oct. 11, 2007], retrieved from the Internet at <URL: http://www.ibm.com/developerworks/db2/zones/informix/library/samples/db_sqlj.html>, 7 pp.

Xu, J., and J. Chang, "Enabling Your Business Data for XML with DB2 XML Extender", Feb. 2000, 29 pp.

Fan, M., J. Stallaert, and W.B. Whinston, "A Web-Based Financial Trading System", Computer, vol. 32, Iss. 4, 1999, pp. 64-70.

Kreger, H., "Web Services Conceptual Architecture (WSCA 1.0)", IBM White Paper, 2001, 40 pp.

Saganich, A., "Java and Web Services Primer", [online], Aug. 7, 2001, [retrieved on Feb. 17, 2008], retrieved from the Internet at <URL: http://www.onjava.com/lpt/a/1025>, 7 pp.

Accenture, Ariba, Inc., "UDDI Technical White Paper", Sep. 6, 2000, 13 pp.

Dovey, M.J., "UDDI (Universal Description, Discovery and Integration) Standard and Initiative", Jun. 2001, 19 pp.

IBM Corp., "Business Explorer for Web Services", [online], Dec. 3, 2001, [Retrieved on Jan. 28, 2010]. Retrieved from the Internet at <URL: http://www.alphaworks.ibm.com/tech/be4ws>, 2 pp.

Oasis, "About UDDI XML.org", 2007 [online], © 1993-2010 OASIS, [Retrieved on Jan. 1, 2010]. Retrieved from the Internet at <URL: http://uddi.xml.org/about>, 4 pp.

Decision on Appeal, Jun. 2, 2011, for U.S. Appl. No. 09/968,353, Total 9 pp.

\* cited by examiner

Service-oriented architecture

DADX 51

```
<?xml version="1.0"?>
<DADX xmlns="urn:ibm:.com:dadx"....>

<SQL_call>CALL Myproc(:query1, :query2, :query3)</SQL_call>

<SQL_query>select * from order_tab
...
</SQL_query>

<SQL_update>insert into order_tab
...
</SQL_update>

<retrieveXML>
    <DAD_ref>getstart_xcollection.dad</DAD_ref>
    <SQL_override>
    select o.order_key, customer_name, customer_email...

</SQL_override>
</retrieveXML>
```

FIG. 5

METHOD, SYSTEM, AND PROGRAM FOR GENERATING A PROGRAM CAPABLE OF INVOKING A FLOW OF OPERATIONS

RELATED APPLICATIONS

This patent application is a continuation-in-part of the copending and commonly assigned U.S. patent application, Ser. No. 09/968,353, filed on Sep. 28, 2001, which patent application is incorporated herein by reference in its entirety.

BACKGROUND OF THE INVENTION

1. Field of the Invention

The present invention relates to a method, system, and program for generating a program capable of invoking a flow of operations 2. Description of the Related Art A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines (IBM) MQSeries Workflow software product. There is a need in the art to develop techniques to utilize workflow technologies with different computing platforms.

SUMMARY OF THE DESCRIBED IMPLEMENTATIONS

Provided are a method, system, and program for generating a program capable of invoking a flow of operations, wherein the program is capable of being initiated from an external call. A definition file defining a flow of operations and mapping information defining input parameters to the flow of operations are received. The received definition file and mapping information are processed to generate program statements within the program that when executed perform: setting input parameters to the flow of operations to values received from an external call to the program; invoking the flow of operations with the input parameters including values from the external call; and receiving output from the flow of operations and extracting at least one value from the received output to return to the external call.

In further implementations, the flow of operations comprises a workflow, wherein the mapping information indicates methods used to set and retrieve input parameters to the workflow and information on output returned from the workflow.

In yet further implementations, the mapping information includes information to map values received from the database program of a database data type to the input parameters to the flow of operations in a flow data type used by the flow of operations, and to map values in the flow data type received from the flow of operations to the database data type to return to the database program.

Further provided are a method, system, and program for invoking a workflow. A call is received from a database program to invoke a workflow. The workflow is invoked in response to the call. Output from the workflow is received and returned to the database program.

In further implementations, the received call includes input parameters, wherein the workflow is invoked with workflow parameters including input parameters included with the call.

Yet further, the received call includes input parameters, wherein the workflow is invoked with workflow parameters including input parameters included with the call.

Described implementations provide techniques to enable workflow operations to be invoked from a database program.

BRIEF DESCRIPTION OF THE DRAWINGS

Referring now to the drawings in which like reference numbers represent corresponding parts throughout:

FIG. 5 depicts a document access definition extension file;

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Invoking Web Services from a Database

Figure 1:
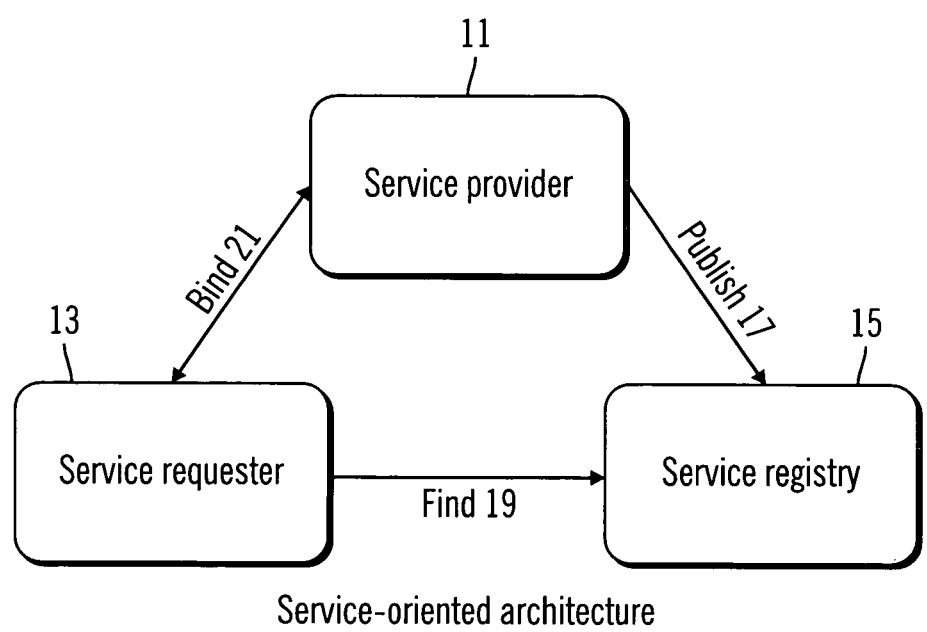
FIG. 1 depicts a services-oriented architecture.

The nature of Web services make them natural components in a service-oriented architecture. A typical service-oriented architecture is shown in FIG. 1. Service providers 11 host a network accessible software module. A service provider defines a service description for a Web service and publishes it to a service registry 15, as depicted by arrow 17. A service requester 13 at a client computer uses a find operation, represented by arrow 19, to retrieve the service description from the registry 13 and uses the service description to bind with the service provider, as represented by connector 21, and to invoke or interact with the Web service implementation. To facilitate this architecture, the client is connected to a router (not shown) at the service provider's server. Preferably, the connection between the client computer and the router is established via the Internet, but other connections can be used. It can be appreciated that the client computer connects to the Internet via telephone modem, cable modem, LAN, WAN, T1 or any other means well known in the art.

Figure 2:
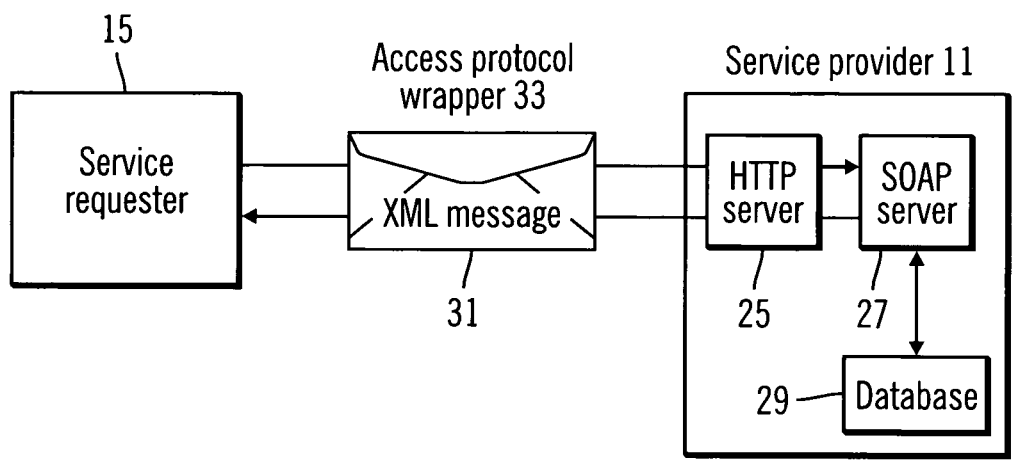
FIG. 2 represents a web service invocation or response transferred as a wrapped XML message between a service provider and a service requestor.

Applying the preceding model to web services and referring to FIG. 2, a service provider 11 makes an application available over the web as a Web service by wrapping the application in such a way that it can be accessed using standard XML messages, i.e., application-specific messages 31 are sent in standard XML document formats conforming to the corresponding service description. The XML messages 31 are themselves placed in a wrapper 33 in such a way that masks the underlying transport protocol. For example, an application message is placed in an XML wrapper by an XML extender administrative servlet (DXX admin servlet, not shown) included in the router at the service provider's database 29. XML messages 31 are then wrapped in Simple Object Access Protocol (SOAP) envelopes 33 at SOAP server 27 and posted to the web via HTTP server 25.

The DXX admin servlet configures at least one DXX invoker, which in turn can access at least one document access definition extension (DADx) file. The DADx file, in turn, can access one or more document access definition (DAD) files.

DXX is a collection of stored procedures, user defined types (UDTs), and user defined functions (UDFs) that are typically used in programs written in SQL, Java, C++, and other languages. The DXX invoker handles universal resource locators (URLs) having the extensions ".dadx" that reference web services and ".dtd" that reference document type definition (DTD) documents. Specifically, the DXX invoker provides runtime support for invoking DADx documents as web services written, e.g., in Apache Simple Object Access Protocol (SOAP). The servlet of the router connects to a database at invocation times. Preferably, this connection is established by a Java database connection (JDBC).

In one possible embodiment, the DXX Invoker, a Java component, interfaces with Apache SOAP 2.1 runtime using a pluggable provider support. A web application developer creates an instance of the DXX Invoker for each database that is to be accessed. Each instance of the DXX Invoker is associated with a database connection and a set of DADx files. The DXX Admin servlet is provided to simplify the task of creating instances of the DXX Invoker. Specifically, the DXX Admin servlet provides a web user interface for configuring instances of the DXX Invoker. Someone, e.g., a database administrator, sets up the databases and enables them for use by DXX. The service provider creates DAD and DADx documents and deploys them to the web application. Each DADx document is associated with a URL that identifies a specific web service.

SOAP is an application invocation protocol developed by IBM, Microsoft, and others that defines a simple protocol for exchanging information encoded as XML messages 31. SOAP is in the process of being more formally specified by the World Wide Web Consortium (W3C) as XML Protocol. The beauty of SOAP is that it makes no assumptions on the implementation of the endpoints. This means that a service requester 15 needs only to create an XML request, send it to a service provider 11, and understand the XML response that comes back.

A SOAP request 33 consists of the envelope itself, which contains the namespaces used by the rest of the SOAP message, an optional header, and the body, which may be a remote procedure call (RPC) or an XML document. SOAP builds on existing Internet standards such as HTTP and XML, but can be used with any network protocol, programming language, or data encoding model. For example, it is possible to send SOAP messages over IBM MQSeries®, FTP or even as mail messages.

The logical interface and the service implementation are described by the Web Services Description Language (WSDL). WSDL is an XML vocabulary used to automate the details involved in communicating between Web services applications. There are three pieces to WSDL: a data type description (XML schema), an interface description, and binding information. The interface description is typically used at development time and the binding information may be used at either development or execution time to actually invoke a particular service at the specified location. The service description is key to making the Web services architecture loosely coupled and reducing the amount of required shared understanding and custom programming between service providers and service requesters. As previously noted, the WSDL description is stored in a WSDL document. This WSDL document may be stored in numerous ways; in a file, in a DB2 XML Registry/Repository, or in a DB2 based UDDI Registry.

Referring back to FIG. 1, the service can be publicized by being registered in a standard-format service registry 13. This registry makes it possible for other people or applications to find and use the service. For example, one can publish descriptive information, such as taxonomy, ownership, business name, business type and so on, via a registry that adheres to the Uniform Description, Discovery and Integration (UDDI) specification or into some other XML registry. The UDDI information can include a pointer to WSDL interfaces, the binding information, and a business name (the name that makes the purpose of the Web service understandable to humans). A UDDI registry is searchable by programs, enabling a service requester to bind to a UDDI provider to find out more information about a service before actually using it.

The ability to compose Web services together is provided, for example, by Web Services Flow Language (WSFL), another specification defined by IBM and others. WSFL can be used to describe a business process (that is, an execution flow from beginning to end), or a description of overall interactions between varying Web services with no specified sequence. It is more fully described in the WSDL V1.0 specification available at http://www-4.ibm.com/software/solutions/webservices/pdf/WSFL.pdf, (Referenced as Appendix C) appended hereto and incorporated herein by reference. The mechanism for creating a WSFL description is described in an article at http://www-106.ibm.com/developerworks/webservices/library/ws-ref4/, (Referenced as Appendix D) appended hereto and incorporated by reference.

Looking at how all of these specifications work together, a Web service can be defined as a modular application that can be:

Described using WSDL
Published using UDDI
Found using UDDI
Bound using SOAP (or HTTP GET/POST)
Invoked using SOAP (or HTTP GET/POST)
Composed with other services into new services using WSFL Access to Web services may be restricted much as one would restrict access to Web sites that are not available to everyone. For example, IBM WebSphere® provides many options for controlling access and for authentication. The standards for this are still emerging. Microsoft and IBM have proposed a SOAP security extension to the W3C as the mechanism for XML digital signatures. The SOAP security extension included with WebSphere Application Server 4.0 is intended to be a security architecture based on the SOAP Security specification, and on widely-accepted security technologies such as secure socket layer (SSL). When using HTTP as the transport mechanism, there are different ways to combine HTTP basic authentication, SSL, and SOAP signatures to handle varying needs of security and authentication.

IBM is enabling its key programming models and application servers with Web services and is providing and developing tools to automatically generate Web services from existing artifacts such as Java Beans, EJBs, and stored procedures. The following types of web service operations are provided: XML-based query or storage, wherein an XML document is decomposed for storage in DB2 relational tables and composed again on retrieval; and SQL-based operations, such as calling stored procedures, or inserting, updating, deleting DB2 data.

Figure 3:
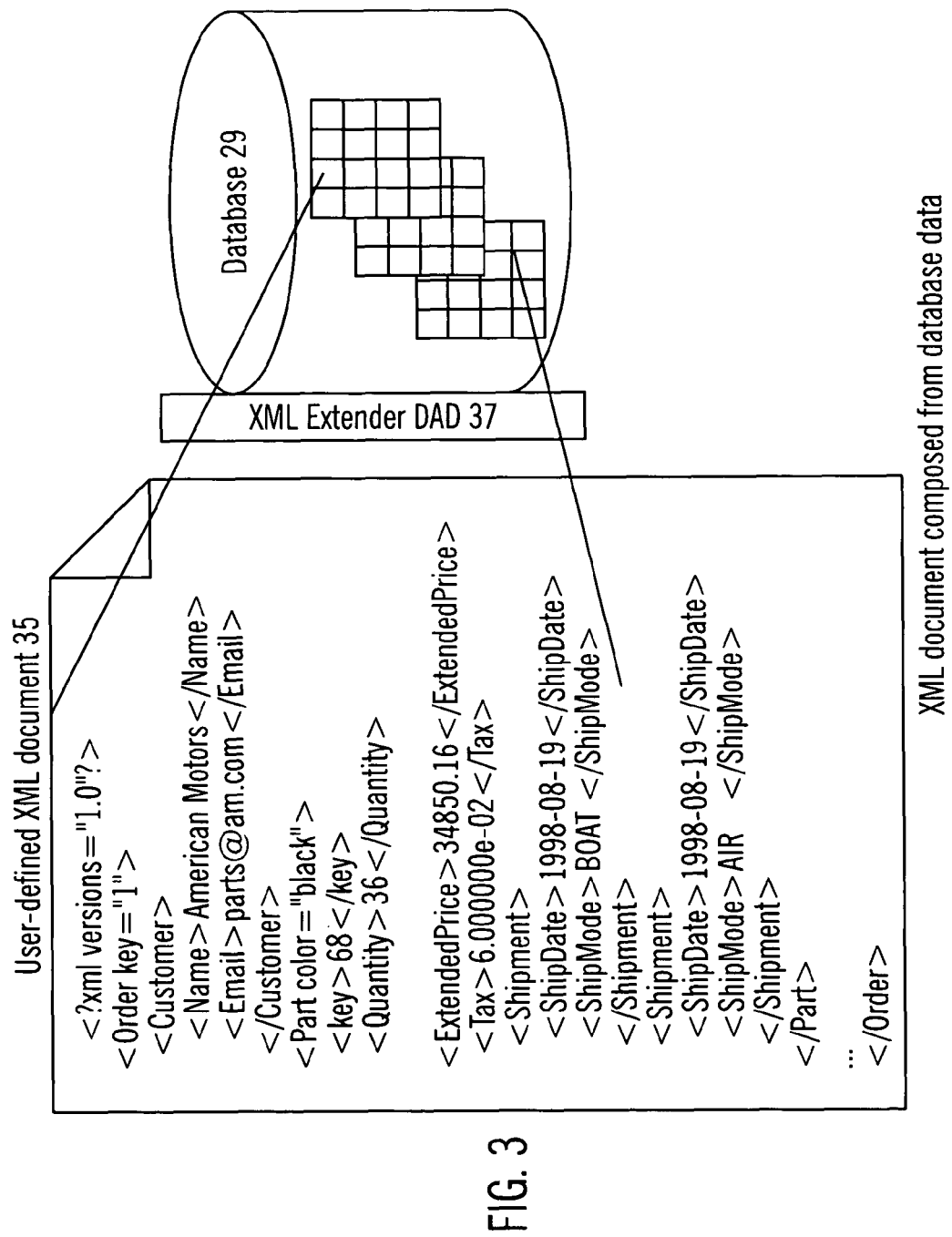
FIG. 3 represents an XML document composed from data in stored in a relational database and a document access definition.

XML-based query: Referring now to FIG. 3, XML-based querying permits composition of XML documents 35 from relational data stored in tables 38 of a database 29. One may also break an XML document 35 down into its component parts and store it into relational tables 38 of the database 29. Part of the underlying support for this functionality is provided by DB2 XML Extender. The store and retrieve operations are handled by special stored procedures that are shipped with DB2 XML Extender.

Figure 4:
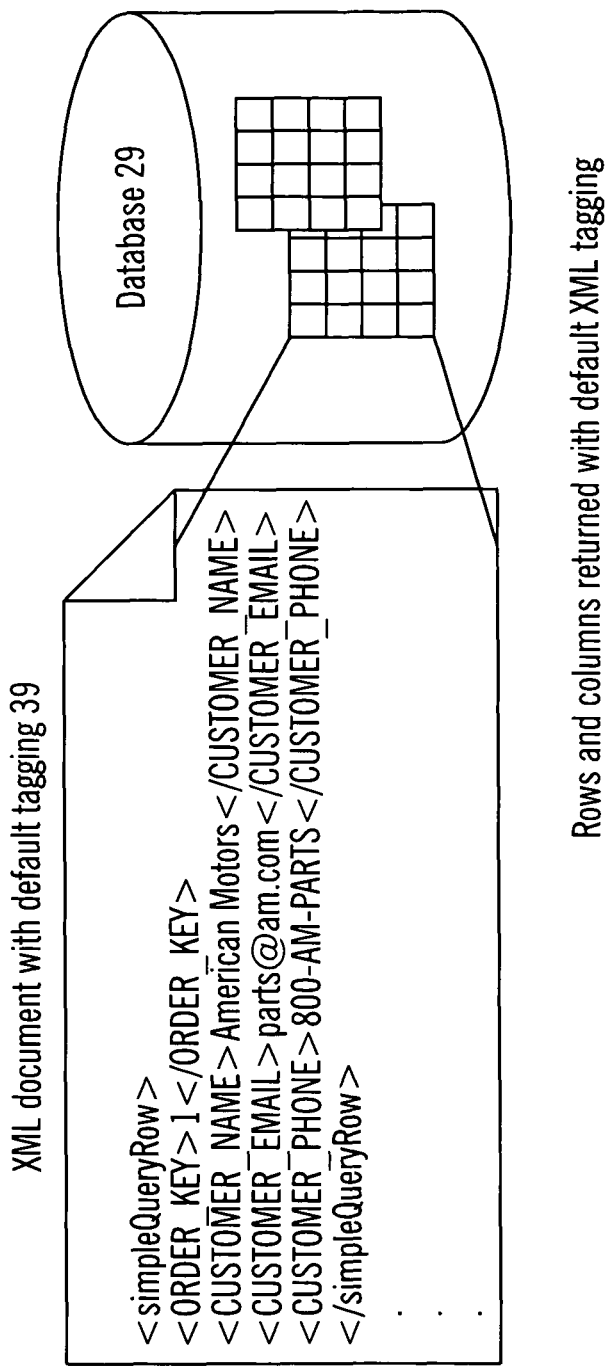
FIG. 4 represents relational data reformatted into an XML document using default tagging.
Figure 6:
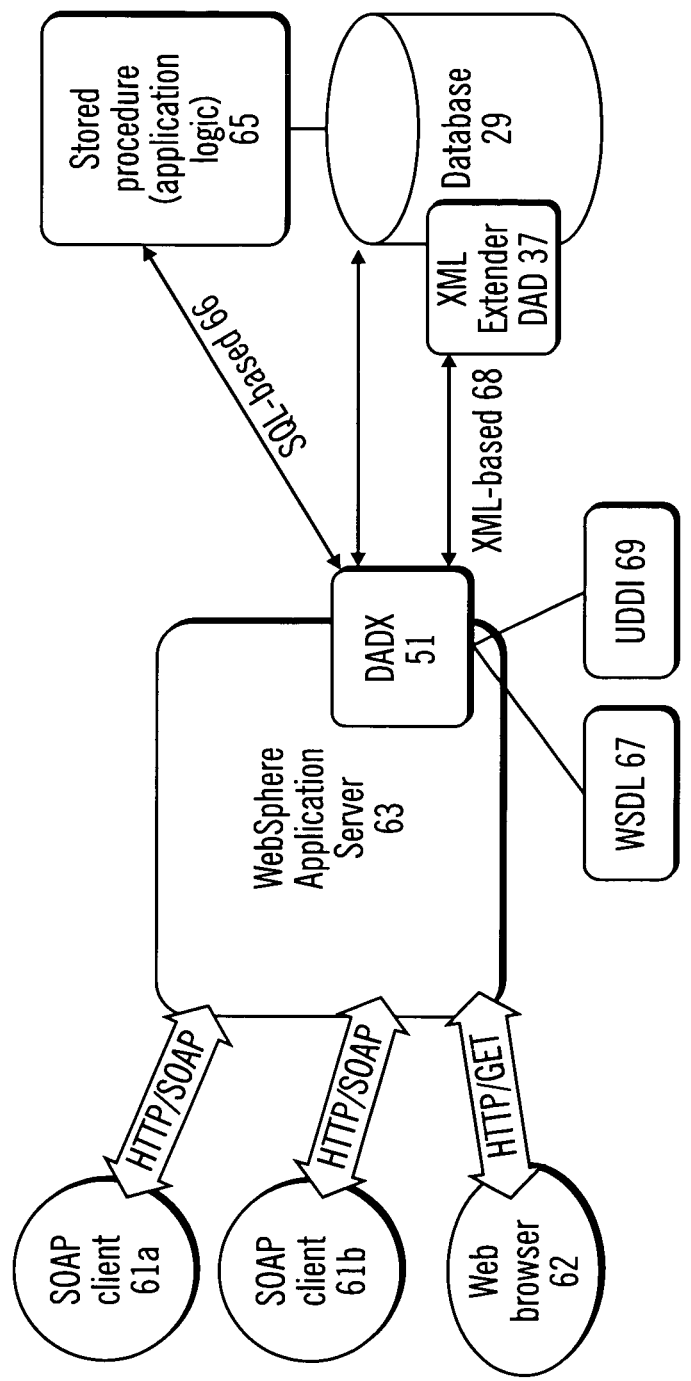
FIG. 6 depicts a web services architecture.

One of the inputs into both storage and retrieval is the user-specified mapping file 37 that creates the association between relational data and XML document structure. This mapping file 37 is called a Document Access Definition (DAD) 37 and provides a way to create an XML document 35 and specify the XML elements, attributes and shape desired. The focus of this approach is in moving and manipulating XML documents. SQL-based query: Referring now to FIG. 4, SQL-based querying is simply the ability to send SQL statements, including stored procedure calls, to the database 29 and to return results with a default tagging 39.

The focus of this approach is actually the data in and out of the database 29, not on shaping the results in a particular way. SQL-based query does not require the use of an XML Extender because there is no user-defined mapping of SQL data to XML elements and attributes. Instead, the data is returned using only a simple mapping of SQL data types, using column names as elements.

However, if one is using DB2 XML Extender to store XML documents within a single column of a table, one may use SQL-based queries to retrieve those documents intact as a character large object (CLOB), or to invoke the user-defined functions that extract parts of the document. Another feature of DB2 XML Extender is the ability to store frequently-accessed data in side tables, thereby enabling speedy searches on XML documents that are stored in columns.

Another useful thing one may do with SQL-based query is to invoke DB2 stored procedures. Stored procedures are natural for conversion to Web services since they are themselves an encapsulation of programming logic and database access. A Web service invocation of a stored procedure makes it possible to dynamically provide input parameters and to retrieve results.

Both the XML-based and SQL-based forms of querying are controlled by the DADX, a configuration file shown in FIG. 5. The DADX configuration file defines the operations that can be performed by the Web service. For example, one might have a DADX file that specifies the operations to find all orders for parts, find all orders for parts with a particular color, and orders for parts that are above a certain specified price. The color or price can be specified at runtime as input parameters by using host-variable style notation in the query.

Use of DADX or similar mechanisms has enabled the development of a tool that automatically generates the WSDL description of the interfaces and publishes the interfaces to a UDDI registry or some other service directory. The tool also generates the artifacts needed to deploy the Web service into a web development tool such as WebSphere, and the client proxies that may be utilized for testing and as a basis for building the client part of one's Web application.

To help with the configuration task, a database connection configuration servlet is also provided. This servlet provides a Web-based interface to guide a user through the task of configuring database connections. One may have many DADX files that use the same database configuration.

A database both manages data and provides intelligent access to it. Optimized queries, complex analysis, and efficient execution of business logic may all be provided by the database engine. The database can be viewed as an efficient and powerful set-oriented execution engine that typically works on locally managed data. Indeed, the set-oriented processing of DB2 can be used to operate on more than just locally managed data. DB2 Relational Connect allows remote, heterogeneous relational databases to be treated as local resources. DB2 also provides features built-in to SQL that enable external applications and systems to be manipulated in a set-oriented manner.

According to the present invention, a database can invoke a web service by representing the remote web service as a virtual table or function residing on the database. The virtual table may then be manipulated within an SQL statement. The mechanisms proposed for representing the remote web service according to the preferred embodiment are a user-defined function (UDF) contained within an SQL statement, a stored procedures (SP) containing calls or SQL statements to invoke the web service, or a wrapper created around the web service and providing the machinery for communicating with the external web service.

User defined functions (UDFs) are a powerful SQL mechanism enabling users to define new operators to SQL that return either a single value or that return a tabular value. This UDF mechanism may be used to invoke external applications and to return virtual tables of data back to DB2.

Figure 7:
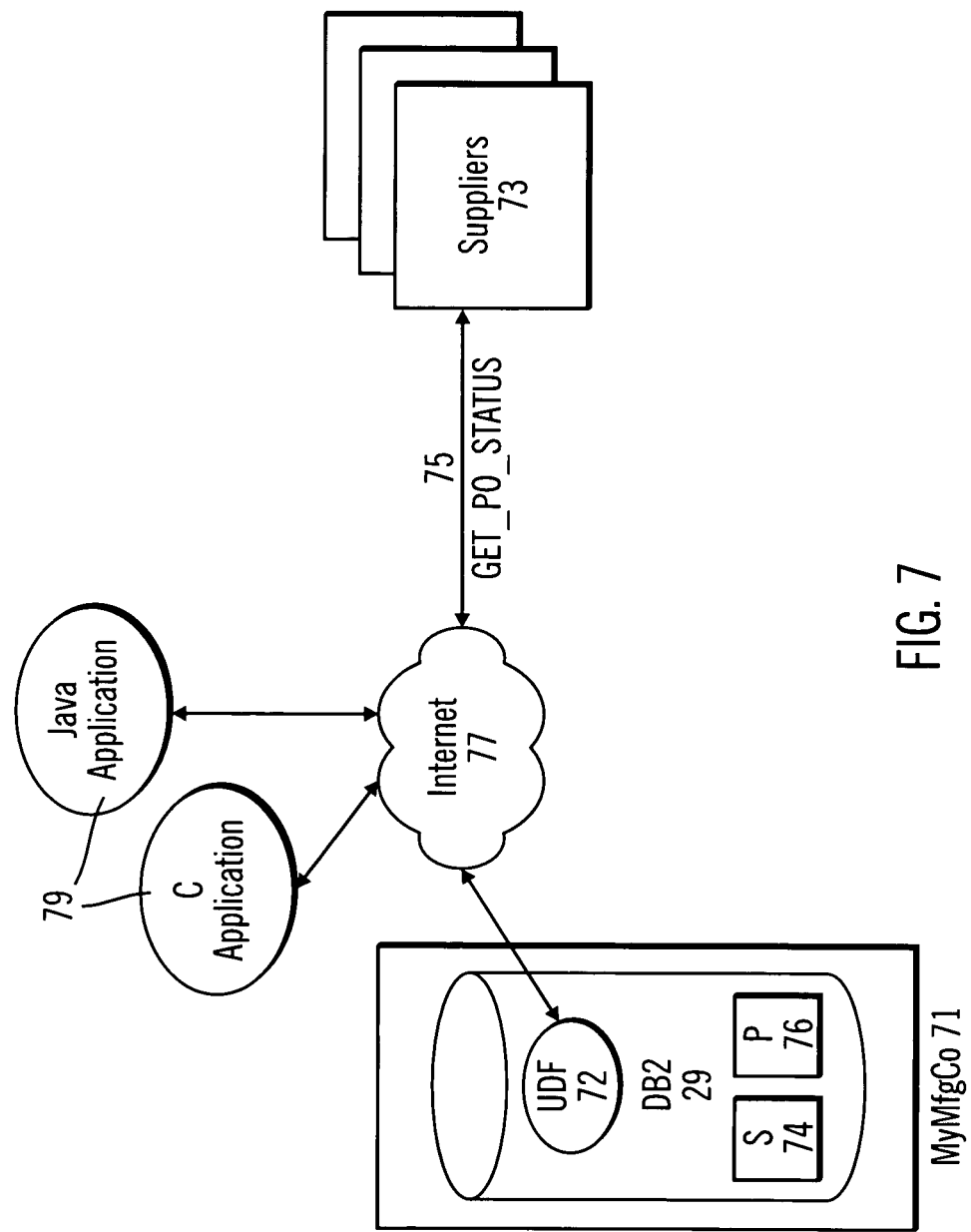
FIG. 7 represents a web services architecture facilitating invocation of a web service by a database.

FIG. 7 represents an exemplary system comprising a manufacturing company, myMfgCo 71, that works with a number of suppliers 73 around the world over the internet 77. The supplier systems comprise, for example, mainframes, Unix-based systems, laptops, etc. The manufacturing company 71 wishes to know the status of outstanding orders that it has placed. It therefore asks the suppliers 73 to provide it with a set of Web service interfaces, represented diagramatically in FIG. 7 with flow arrow 75, for facilitating the retrieval of desired information over the internet 77. The manufacturing company 71 further requests a web service for returning the status of a purchase order. Logically, the service may be invoked as follows:

ex 1: string GET_PO_STATUS(string URL, string PO_NUM)

The preceding function is implemented as a very simple Web service by the suppliers 73 according to emerging web service protocols. Implementing the function as a Web service allows it to be easily invoked by a wide variety of clients. The invoking application may execute, for example, on a Unix-based system, a laptop, a mainframe, a browser or a Java application 79. However, according to the present invention the manufacturer 71 preferably invokes the application from within its database 29. Invocation is accomplished from a DB2 database with a user-defined function (UDF) 72 having the following signature:

ex 2: varchar(20) GET_PO_STATUS (URL varchar(80), PO_NUM varchar(20))

Here the return value is the PO status and the input parameters are the URL to which the request is to be sent and the identity of the purchase order whose status is of interest. To find the status of a specific purchase order, e.g., "12345", at a supplier 73 that offers this service at http://www.Asupplier.com/GET_PO_STATUS, the following SQL statement is issued:

ex 3: values GET_PO_STATUS('http://www.Asupplier.com/GET_PO_STATUS','12345')

Now assume that the manufacturer 71 has a table 74 filled with outstanding purchase orders and another 76 containing information about the web service operations each supplier offers. Such tables might look like:

| PURCHASE_ORDERS | | | |
|---|---|---|---|
| Customer | Supplier | PO_NUM | O_NUM |
| C1 | ASupplier | 12345 | a456 |
| C1 | BSupplier | 12347 | b456 |
| C3 | BSupplier | 34656 | d435 |

| SUPPLIER_OPS | | |
|---|---|---|
| Supplier | Operation | URL |
| ASupplier | GET_PO_STATUS | http://www.Asupplier.com/GET_PO_STATUS |
| ASupplier | GET_QUOTE | http://www.Asupplier.com/GET_QUOTE |
| Bsupplier | GET_QUOTE | http://www.Bsupplier.com/services/GET_QUOTE |
| BSupplier | GET_PO_STATUS | http://www.Bsupplier.com/services/GET_PO_STATUS |

To find out the status of outstanding purchase orders from ASupplier for all of the manufacturer's customers, the following SQL is issued:

ex 4: select Customer, PO_NUM, GET_PO_STATUS ('http://www.ASupplier.com/GET_PO_STATUS.jsp', PO) as PO_STATUS from PURCHASE_ORDERS where Supplier='ASupplier'

In the forgoing example, the address of the service to be invoked is explicitly stated. It is more likely that the manufacturer 71 would like to find the status of all outstanding purchase orders from all suppliers 73 offering a web service interface. This is achieved by replacing the web address with a parameter, e.g.:

ex 5: select P.Supplier, P.PO_NUM, GET_PO_STATUS (P.PO, S.Service_Address) as PO_STATUS from PURCHASE_ORDERS P, SUPPLIER_OPS S where P.Supplier=S.Supplier and S.operation='GET_PO_STATUS'

Alternatively, one may query the UDDI or other registry directly rather than having to maintain a Supplier_Ops table. For example, the UDDI can be browsed for web services that satisfy the required information, and those web services of interest may be incorporated into the select statement. Or, the manufacturer 71 may require suppliers 73 to name their web services with a pre-determined name and then query the registry for the name directly in the query.

A further aspect of the invention, described subsequently, a tool may be used to automatically generate a user-defined function from the WSDL definition of a web service for use in the SQL query.

For convenience, the query of example 5, above may be represented as an output table or "view" to provide a simpler interface:

ex 6: create view order_status as
  select o.customer, o.po_num, o.supplier,
    get_po_status(s.URL, o.po_num) as status
  from purchase_orders o, supplier_ops s
  where o.supplier=s.supplier and s.operation 'GET_PO_STATUS' ex 7: select * from order_status

This query may be extended to exploit features of SQL. For instance, to sort the result by supplier and purchase order status one simply appends an order by clause such as:

ex 8: select Customer, Supplier, PO_NUM, GET_PO_STATUS(P.PO, S.Service_Address) as PO_STATUS
  from order_status
  order by Supplier All the examples so far show how a web service that returns a single value can be integrated with DB2 SQL, but how are multiple return values handled? Assume that the manufacturing company 71, excited by the power of such a simple Web service as GET_PO_STATUS, now convinces its suppliers 73 to implement a service to respond to quotation requests (RFQs). This RFQ Web service would have the following signature:

| RFQ | | | |
|---|---|---|---|
| Inputs | part_num | qty | desired_date |
| | string | iInteger | date |
| Outputs | price | proposed_date | |
| | decimal | date | | ex 9: RFQ inputs: String part_num, Integer qty, Date desired_delivery_date outputs: Decimal price, Date proposed_delivery_date This service may be made accessible to DB2 by turning it into a DB2 Table Function, i.e., by creating a virtual table representative of the web service. Other relational database products may provide similar mechanisms for creating a virtual table. The DB2 Table function has the following parameters:

| GET_Quote | | | | | | | |
|---|---|---|---|---|---|---|---|
| Inputs | supplier varchar(30) | URL varchar(80) | part_num varchar(20) | qty iInteger | desired_date date | | |
| Outputs | supplier varchar(30) | URL varchar(80) | part_num varchar(20) | qty iInteger | desired_date date | price decimal | currency varchar (10) | proposed_date date |

To provide more meaningful context, the table function includes as outputs all of the interesting input parameters. The Get_Quote table function is invoked inside of a query such as:

ex 10: Select * from table (Get_Quote ('ASupplier', 'http://www.Asupplier.com/GET_QUOTE', '52435FFA',25, '7/1/2001') t This statement will return back a table containing a single row with the response from this supplier. But what if the manufacturing company 71 dealt with suppliers in other countries? The Get_Quote function contains the currency units, so it would be an easily matter to convert the price to dollars. Now to perform the conversion one could, of course, try to manually maintain a table of currency conversion data—but given the volatile nature of foreign exchange, it would be better to invoke another Web service, perhaps provided by a foreign exchange trading firm, to perform this conversion for us using up to the minute information. The DB2 function to invoke this service will be:

To_Dollars: inputs (Currency varchar(10), amount decimal) outputs (amount decimal)

Using this additional service, one may obtain a more accurate quote using a query such as:

ex 11: Select t.supplier, t.part_num, t.qty, (t.desired_date—t.proposed_date) as timeliness, to_dollars(t.currency, t.price) as cost from table (Get_Quote ('ASupplier', 'http://www.Asupplier.com/GET_QUOTE', '52435FFA',25, 'Jul. 1, 2001') t In the preceding example the columns have been explicitly stated and, using the power of SQL, an output column named timeliness has been defined to reflect the deviation between the manufacturer's desired date and the date proposed by the supplier 73 for the part. The currency conversion web service, to_dollars, has been utilized to convert the quoted price to U.S. currency. This query will return a single row with the quote from a single vendor for a single part. What if the manufacturer 71 had a list of needed parts that it wished to get quotes on? A table called NEEDED_PARTS is defined for this purpose:

| NEEDED_PARTS | | |
|---|---|---|
| part_num | qty | desired_date |
| 34dsaf | 20 | 7/1/2001 |
| 35gfds | 34 | 8/1/2001 |
| 809gds | 10 | 6/30/2001 |

Now to get quotes on all of these parts from ASupplier, the following SQL is issued:

ex 12: Select t.supplier, n.part_num, n.qty, (n.desired_date—t.proposed_date) as timeliness, to_dollars(t.currency, t.price) from needed_parts n, table (Get_Quote ('ASupplier', 'http://www.Asupplier.com/GET_QUOTE', n.part_num, n.qty, n.desired_date) t This query returns a table of quotes for each part listed in the NEEDED_PARTS table from Asupplier. But what the manufacturer 71 wanted to get quotes for each of its suppliers? To do so, the following query is issued:

ex 13: Select n.part_num, t.supplier, n.qty, (n.desired_date—t.proposed_date) as timeliness, to_dollars(t.currency, t.price) from needed_parts n, supplier_ops s, table (Get_Quote (s.supplier, s.URL, n.part_num, n.qty, n.desired_date) t
where s.operation='GET_QUOTE'
order by n.part_num, timeliness So the above query generates quotes for all the needed parts from all the suppliers that offer the GET_QUOTE Web service and returns a table of these quotes ordered by part number and timeliness. Very powerful, yet simple, standard DB2 SQL.

Finally, the manufacturer 71 may want to expose this query as a Web service itself so that its purchasing agents can invoke the query from wherever they are as long as they have access to the internet. DB2 7.2 with the XML Extender provides a simple mechanism that allows Web services to be created in support of such queries. The extender allows stored procedures and SQL statements to be exposed as invokable Web service operations, as is described more fully in http://www.ibm.com/software/data/db2/extenders/xmlext, (Referenced as Appendix E) appended hereto and incorporated by reference herein. Any catalogued stored procedure may be exposed. The operation signature includes the input and output parameters and will also return one or more stored procedure result sets as an XML document.

To summarize, the preceding example illustrates how Web services may be integrated into DB2 SQL as User Defined Functions. Once Web services can be invoked as UDFs one can leverage the full power of SQL to perform queries across combinations of Web services and persistent data.

Additional invocation mechanisms available for integrating a web service into a database are described below.

In a third specific embodiment, the mechanism for invoking a web service is a stored procedure. Stored procedures are well-known in the art of relational databases. A stored procedure is invoked by a call, e.g., from a database client, e.g., a command line processor, a JDBC client, another stored procedure, a static c program or embedded SQL application. The stored procedure invokes a web service with, for example, an embedded java class or an SQL statement containing an invocation of the service, e.g., through a UDF or table function, or through any of a number of common client interfaces to web services known to those skilled in the art. For example, creation of Java classes to invoke web services is described in the IBM web services toolkit.

In a fourth specific embodiment, the mechanism for invoking a web service comprises a trigger. Triggers are well-known in the art of relational databases. A trigger is invoked by a triggering event, e.g., a table state change such as inserting a row into a table. The trigger invokes the web service with a call to the web service, or an SQL statement containing an invocation of the service, e.g., through a UDF or table function.

In a fifth specific embodiment, the mechanism comprises a federated table accessed via a nickname and implemented using a wrapper. Such federated tables are known to those skilled in the art of federated databases. The federated table looks like a local table to the database. The wrapper, e.g., a DB2 Relational Connect wrapper, provides the machinery for invoking the external service and receiving the response back.

As a further aspect of the invention, a unique tool is provided for generating user defined functions (UDFs) from web services defined by the WSDL (Web Services Definition Language) notation. These UDFs may then be invoked through standard SQL statements. Used in conjunction with UDDI and the XML Registry/Repository, this means that a user may easily locate useful web services using UDDI, retrieve descriptions of these web services using UDDI and/or XRR and then extend a database with access to these web services by using this tool to generate UDFs.

The steps preformed by the UDF generator are described below, with reference to FIG. 8. A user browses a UDDI or other registry for a desired web service, e.g., a web service that will return the current exchange rate to US dollars from a given currency. This step is represented as step a) in FIG. 8 and may be executed, for example, using an XML query wrapped as a SOAP request. The web service description is returned, for example, as an XML document.

Figure 8:
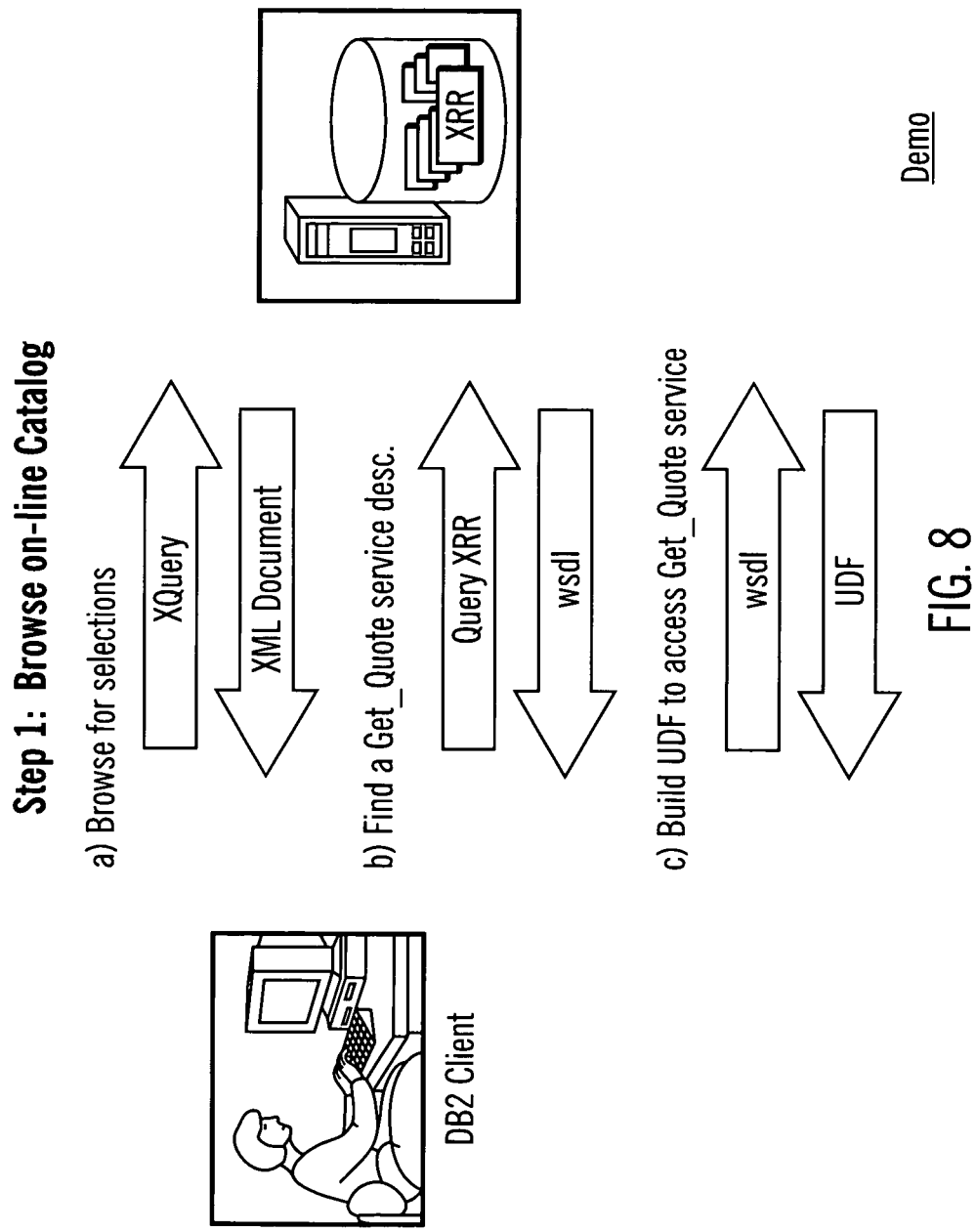
FIG. 8 represents the steps for creating a user-defined function for invoking a web service.

The user then issues a query to XRR or UDDI to find the name of the WSDL file that implements this web service, as shown in FIG. 8 by step b). The contents of the WSDL file of the present example are:

```
<?xml version = "1.0"?>
<definitions name = "CurrencyExchangeService" targetNamespace =
"http://www.xmethods.net/sd/CurrencyExchangeService.wsd1"
xmlns:tns="http://www.xmethods.net/sd/CurrencyExchangeService.wsd1"
xmlns:xsd = "http://www.w3.org/2001/XMLSchema" xmlns:soap =
"http://schemas.xmlsoap.org/wsd1/soap/" xmlns =
"http://schemas.xmlsoap.org/wsd1/">
    <message name = "getRateRequest">
        <part name = "country1" type = "xsd:string"/>
        <part name = "country2" type = "xsd:string"/>
    </message>
    <message name = "getRateResponse">
        <part name = "Result" type = "xsd:float"/>
    </message>
    <portType name = "CurrencyExchangePortType">
        <operation name = "getRate">
            <input message = "tns:getRateRequest" />
            <output message = "tns:getRateResponse" />
        </operation>
    </portType>
    <binding name = "CurrencyExchangeBinding" type =
"tns:CurrencyExchangePortType">
        <soap:binding style = "rpc" transport =
"http://schemas.xmlsoap.org/soap/http"/>
        <operation name = "getRate">
            <soap:operation soapAction=""/>
            <input>
                <soap:body use = "encoded" namespace = "urn:xmethods-
                    CurrencyExchange" encodingStyle =
                    "http://schemas.xmlsoap.org/soap/encoding/"/>
            </input>
            <output>
                <soap:body use = "encoded" namespace = "urn:xmethods-
                    CurrencyExchange" encodingStyle =
                    "http://schemas.xmlsoap.org/soap/encoding/"/>
            </output>
        </operation>
    </binding>
    <service name = "CurrencyExchangeService">
        <documentation>Returns the exchange rate between the two
        currencies</documentation>
        <port name = "CurrencyExchangePort" binding =
"tns:CurrencyExchangeBinding">
            <soap:address location = "http://services.xmethods.net:80/soap"/>
        </port>
    </service>
</definitions>
```

A simple form of the command is executed with the following:

wsUDFGenerator—in http://www.xmethods.net/sd/CurrencyExchangeService.wsdl

This command will result in an SQL script file called CurrencyExchangeService.SQL that contains the definition and implementation of a user-defined function to invoke the currency exchange web service.

Figure 9:
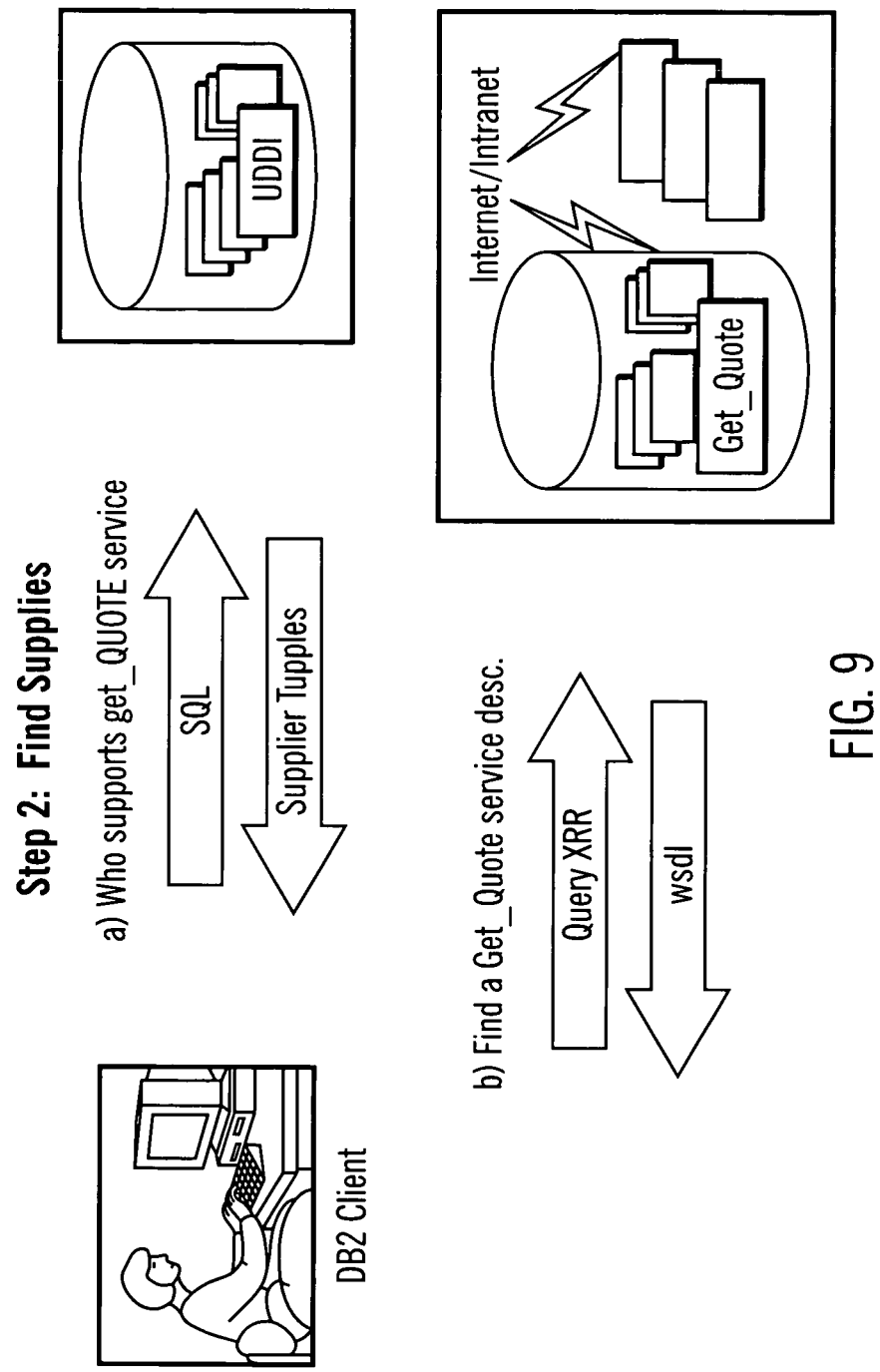
FIG. 9 represents steps for executing a user-defined function for invoking a web service.

Optionally, the user may then query the UDDI or other repository to determine all suppliers who offer the identified web service, as shown in step a) of FIG. 9. For example, the user may issue an SQL query to the remote UDDI and receive tuples containing information about the suppliers. As represented by the forward arrow in step b) of FIG. 9, the UDF may then be invoked within standard SQL statements such as the following:

values getRate('UK','USA') select item, (price * getRate (country, 'USA')) as cost from purchase_orders In addition to creating scalar functions such as above, one may also create table functions where the invocation of the web service yields a table of one or more rows, as represented by the backward arrow in step b) of FIG. 9. For instance, assume that there is a web service that returns status about commercial flights. Using the UDF generating tool one may generate a table function getFlightInfo that returns a table containing the airline, flight number, location, speed, altitude and equipment. The following query illustrates how this may be used:

select t.airline, t.flightNumber, t.currentLocation, t.altitude, t.speed, t.equipment from table (getFlightInfo ('AA','88')) t Of course, once a table function is created, it may be utilized in a variety of ways. For instance, one may return the status of a set of flights, combine this information from other tables and web services, and store information about this flight in a table.

The constructed UDFs make use of general Web Service invocation functions. A general function to invoke HTTP based Web Services, soaphttp, accepts as input parameters the URL of the web service provider, the name of the web service and the name of the particular operation or method to be performed in addition to a string containing the input parameters. The function returns the a single string containing the result of the invocation.

The following example shows an invocation of a very simple web service that accepts a single input parameter (country) and returns a single output parameter.

Values soaphttp('http://services.xmethods.net:80/soap', 'urn:xmethods-CurrencyExchange', 'getRate', 'UK')

Most web services are more complex with multiple input and output parameters, often with complex structures. The web service UDF generator creates the code to construct the input parameters and parse the result into one or more values.

In the examples above, the tool is shown to create UDFs that invoke the web service from a particular provider. Often, a web service will be defined such that it may be implemented by multiple providers. For instance if a company worked with its suppliers to develop a standard web service interfaces to get the order status of outstanding orders, one might want to invoke the same UDF implementing the web service request against many different web service providers, perhaps even in the same statement. The tool currently allows you to specify that a UDF be generated to support this by allowing an additional parameter containing the location of the service provider to be passed at execution time. For example, if we had a table containing the names of suppliers and the URL of the po_status web service they implement then we could issue the following query:

select p.po_number, po_status(p.po_number, s.url), s.supplier from purchase_orders p, suppliers s
    where p.supplier=s.supplier This query invokes the po_status web service for each row in the purchase orders table sending each request to the appropriate supplier service.

Figure 10:
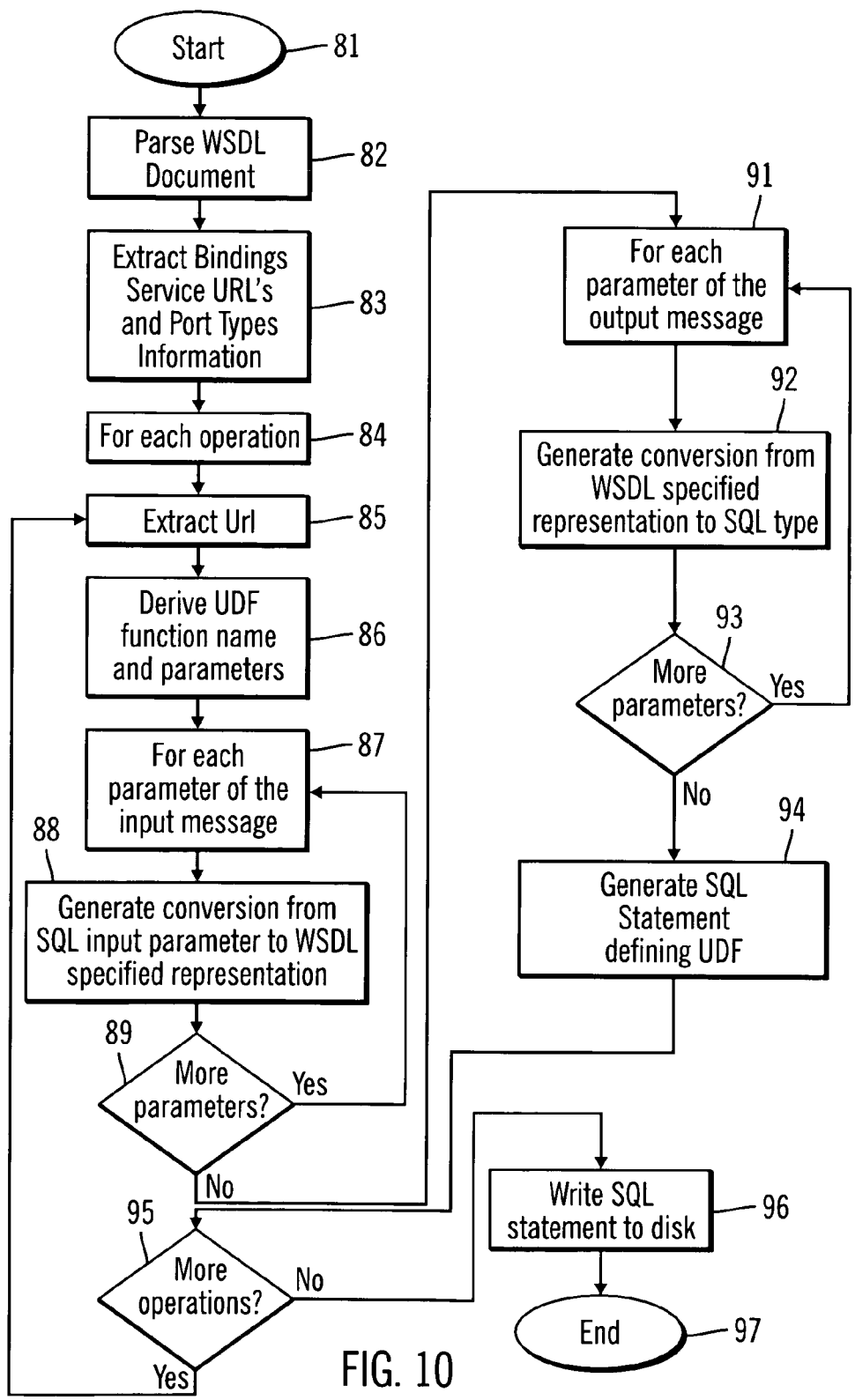
FIG. 10 is a flow diagram depicting the steps of a specific embodiment for generating a UDF from a WSDL document.

FIG. 10 illustrates the steps for creating a UDF from WSDL once the WSDL description has been retrieved from a registry. The starting point of the sequence is represented by block 81. In a first step 82, the WSDL document is parsed. In a next step 83, the bindings, URL's and port types information is extracted from the parsed content of the document. A loop is then initiated at step 84. For each operation contained in the web service description, a URI is extracted 85 and a user-defined function is derived 86, including a name and input parameters. Then a nested loop is initiated at step 87 for each input parameter of the input message, wherein each SQL input parameter is converted to a WSDL-specified representation at step 88 until it is determined at decision diamond 89 that there are no more parameters to convert. Next, another nested loop is initiated at step 91, wherein each output parameter of the output message is converted to a WSDL-specified representation from an SQL type at step 92 until it is determined that the output parameters have been exhausted at decision diamond 93. Next, an SQL statement defining the UDF is generated at step 94. The preceding steps of the operations loop are repeated until it is determined that all operations have been exhausted at decision diamond 95. Finally, the SQL statement is stored on nonvolatile memory in step 96 and the procedure ends, as represented by block 97.

Accessing a Workflow from a Database Environment

Further implementations provide techniques for enabling a workflow to be invoked from a database process that is invoked in response to a database event, such as a database trigger or database query. A workflow comprises a series of pre-defined tasks that are executed based on certain conditions. A workflow program allows businesses and other organizations to define their business operations as a computer model known as a workflow. A workflow may define a series of processes to be performed by users at a client computer. The user activities at the client computers may involve updating an electronic form, reviewing information, etc. After one user in the workflow performs a specified action, the work item or other information is then routed to one or more further nodes where further action may be taken.

A workflow is designed using workflow software, such as the International Business Machines (IBM) Process Choreography Beans ("IBM PC Beans"), MQSeries Workflow, etc. A workflow may be defined using a Worfklow Definition Language (WDL), such as the Flow Definition Markup Language (FDML) that provides a programming language whose statements are coded in an XML file to define a workflow. A workflow defined by an FDML file may be implemented as Java classes or through another programming language. The workflow model is imported into a runtime program that verifies and translates the workflow model into a process template. An instance of the process template can then be invoked to automate the sequence of events defined by the model.

Figure 11:
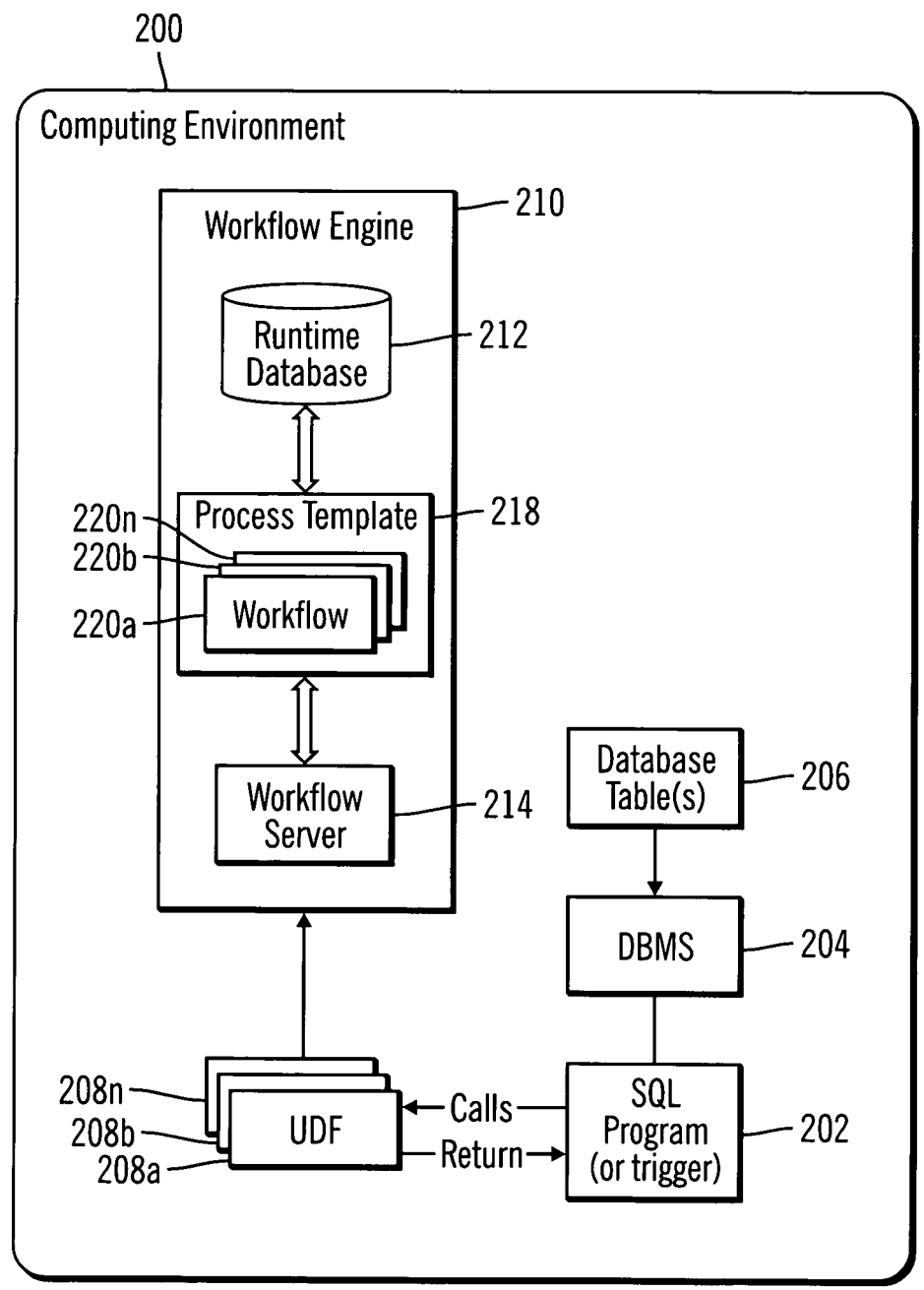
FIGS. 11 and 12 illustrate computing environments in which aspects of the invention are implemented.

FIG. 11 illustrates a computing environment 200 in which an SQL program 202 or trigger performing operations through a database management system (DBMS) 204 with respect to one or more database tables 206, may call one or more User Defined Functions (UDF) 208a, 208b . . . 208n to invoke external operations. The term "SQL program" as used herein refers to a user-written application or program statements called from any database related program, such as a database trigger. The called UDFs 208a, 208b . . . 208n include code to invoke a workflow defined within workflow engine 210. The workflow engine 210 includes a runtime database 212 and a workflow server 214, such as the IBM MQSeries Workflow server. The workflow server 214 is capable of transforming a workflow model coded in a workflow definition language (WDL), such as the workflow description file 244 In FIG. 12, into a process template 218 implemented in the runtime database 212. The runtime database 212 stores database tables that implement the data structures that provide the status and setup information needed for workflow process execution. Whenever the state of a process activity changes, such information is recorded in the runtime database 212. The runtime database 212 may be implemented using any database program known in the art, such as IBM DB2. The process template 218 may include a plurality of different workflow tasks 220***a*, 220*b* . . . 220*n*. For instance, the different workflow tasks 220*a*, 220*b* . . . 220*n* may correspond to different management related tasks to perform. Workflow UDFs can be invoked automatically by a database trigger or "manually" by a user/application including the call to the workflow UDF within an SQL statement.

The workflow server 214 coordinates and manages the execution of processes for a defined process template 218. The workflow server 216 executes any programs associated with a process defined for the workflow, interprets the process definitions, creates process instances and manages their execution, manages processes and states, logs events, communicates with users as part of the workflow, etc. The workflow server 214 may include a database client program (not shown) to access and update records related to the workflow being processed maintained in the runtime database 212. The workflow engine 210, UDFs 208*a*, 208*b* . . . 208*n*, SQL program 202, DBMS 204, and database tables 206 may be distributed across multiple computers to achieve workload balancing.

A database trigger, invoked in response to a database event, or an SQL program 202 (such as a user written application invoked by a user or scheduled to execute at a specific time) may call a UDF 208*a*, 208*b* . . . 208*n* to invoke a workflow 220*a*, 220*b* . . . 220*n* within the workflow engine 210. This may occur in response to a database event or on an ad hoc basis. Multiple UDFs 208*a*, 208*b* . . . 208*n* may be capable of invoking different workflow operations 220*a*, 220*b* . . . 220*n*. The UDFs 220*a*, 220*b* . . . 220*n* would further map input parameters passed by the SQL program 202 call to the UDF to input data to pass to the workflow engine 210 when invoking a particular workflow 220*a*, 220*b* . . . 220*n*. For instance, in implementations where workflows 220*a*, 220*b* . . . 220*n* are invoked through Java functions, the UDF 208*a*, 208*b*. . . 208*n* would have to generate a Java object to pass with the Java function to invoke the workflow 220*a*, 220*b* . . . 220*n*. This requires the UDF 208*a*, 208*b* . . . 208*n* to translate the input parameters from the SQL program 202 comprising database data types to the input format of the workflow command, which may comprise a Java object.

Figure 12:
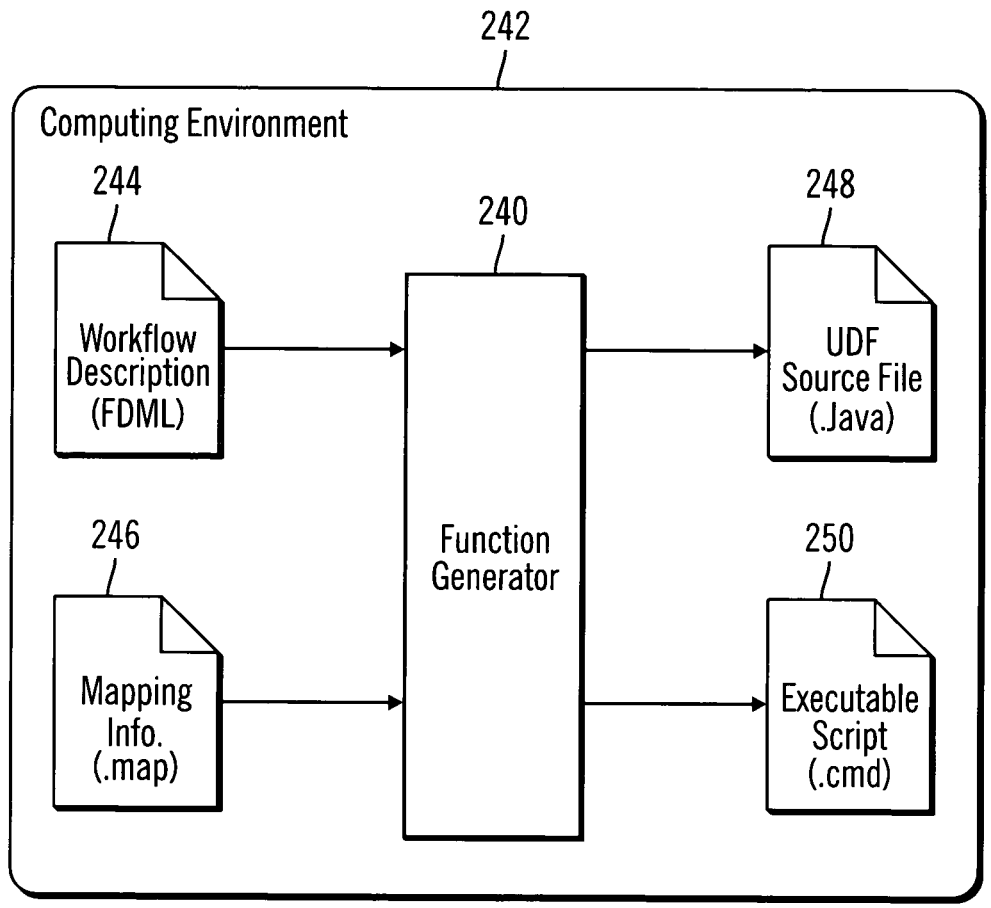

FIG. 12 illustrates components used to automatically generate the UDFs 208*a*, 208*b*. . . 208*n* that the SQL program 202 calls to invoke workflows 220*a*, 220*b* . . . 220*n* within the workflow engine. FIG. 12 shows a function generator program 240 executing in a computing environment 242. The function generator 240 receives as input a workflow description file 244 in a workflow language, such as an XML file including FDML statements defining a workflow, and mapping information 246 that defines the structure of the input and output objects and the subject workflow name for which the UDF 208*a*, 208*b* . . . 208*n* will be defined. In certain implementations, the workflow description file 244 comprises the same file 244 used to generate the process template 218 in FIG. 11. From the received input, the function generator 240 generates the UDF source file 248, which may be called directly by the SQL program 202. The UDF source file 248 would be compiled into executable code, such as Java bytecodes.

Figure 13:
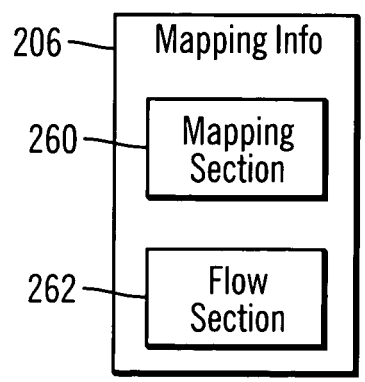
FIGS. 13, 14, and 15 illustrate information used to generate a User Defined Function (UDF) file in accordance with implementations of the invention.

FIG. 13 illustrates the mapping information 246 as having two parts, a mapping section 260 and a flow section 262. The mapping section 260 provides information to enable a mapping between database data types and the input and output data types used by the workflow engine 210, which may comprise objects in an object oriented programming language, such as Java. The flow section 262 provides the name of the workflow function 220*a*, 220*b* . . . 220*n* for which the UDF 208*a*, 208*b* . . . 208*n* will be generated and information on the workflow output to return to the SQL program 202.

Figure 14:
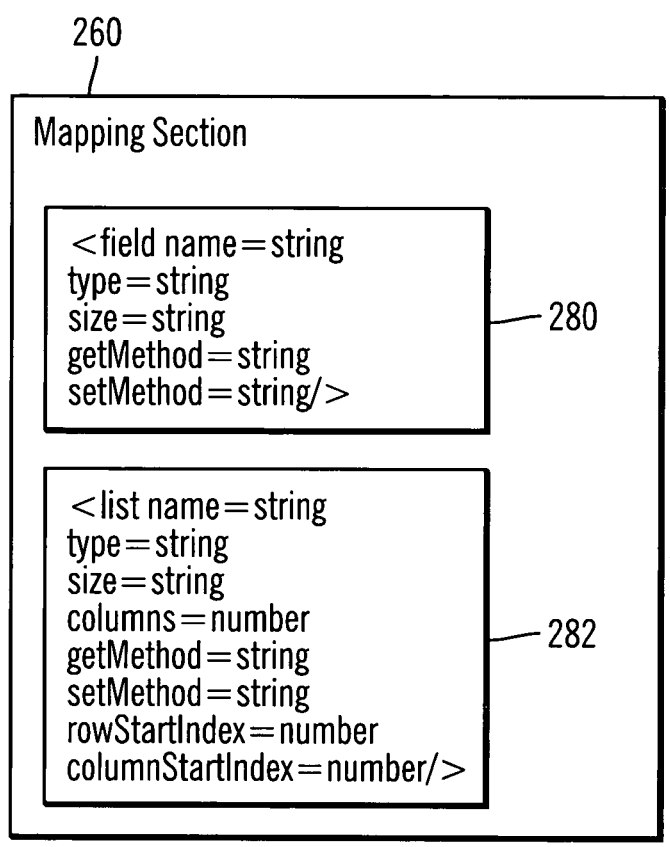

FIG. 14 illustrates an example of information maintained in the mapping section 260. The mapping section 260 may include definitions of the attributes within an object that will be passed to or from the workflow engine 210 when invoking the workflow 220*a*, 220*b* . . . 220*n* associated with the UDF being generated by the function generator 240. Definition 280 includes a name, which is the name of the field in the object to be passed to the workflow; type which is the type; and size is the preferred size of the field. The getMethod and setMethod defines the names of the methods that are used to retrieve and set the value for this field in the object passed with the call to the workflow function within the UDF 208*a*, 208*b* . . . 208*n*. Definition 282 defines a list or table that is generated by the object passed from the workflow. Definition 282 includes the same information included with the definition 280 and additionally includes columns indicating the number of columns in the object; rowStartIndex and columnStartIndex specifying a first row index and a first column index in the list. The mapping section 260 includes the definitions of the fields or attributes passed to and received from the workflow 220*a*, 220*b* . . . 220*n* to pass information from data types used in the DBMS 204 to data types used within the workflow 220*a*, 220*b* . . . 220*n*, which may comprise Java objects, and vice versa.

Figure 15:
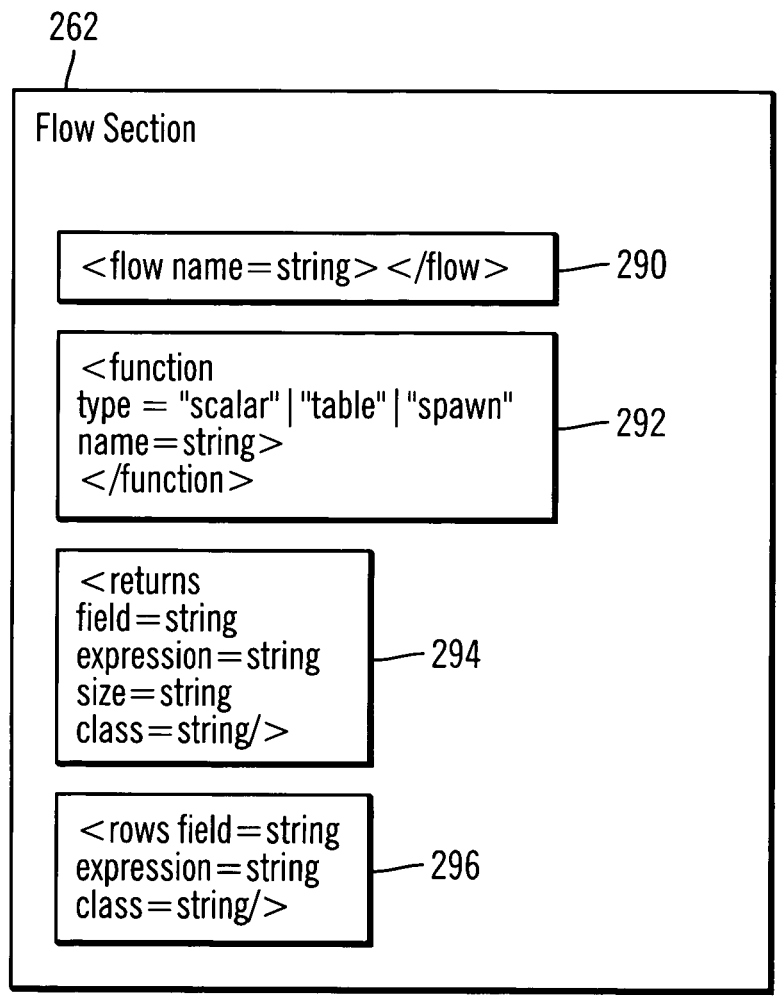

The flow section 262 of the mapping information 246 provides information on the workflow(s) that will be invoked from the UDF 208*a*, 208*b* . . . 208*n* being generated. FIG. 15 illustrates the content of the flow section 262, which includes:

flow name 290: identifies the specific workflow 220*a*, 220*b* . . . 220*n* in the workflow description file 244 which will be invoked.

function 292: indicates whether the workflow function is scalar (executes the flow synchronously and returns a value), table (executes the flow synchronously and returns a set of values), or spawn (function executes flow asynchronously and returns an identifier).

returns 294: indicates the value/values to be returned by the invoked workflow function. If "field" is used, then the name of the field is to be returned and the "class" attribute holds the name of the class containing this field. The UDF 208*a*, 208*b* . . . 208*n* will include code to extract the value from this field to return to the SQL program 202. If "expression" is used, then text will be copied to the return clause. Size specifies the size for the returned value.

rows 296: if the type is a table function, then the rows indicates the number of rows to return.

Figure 16:
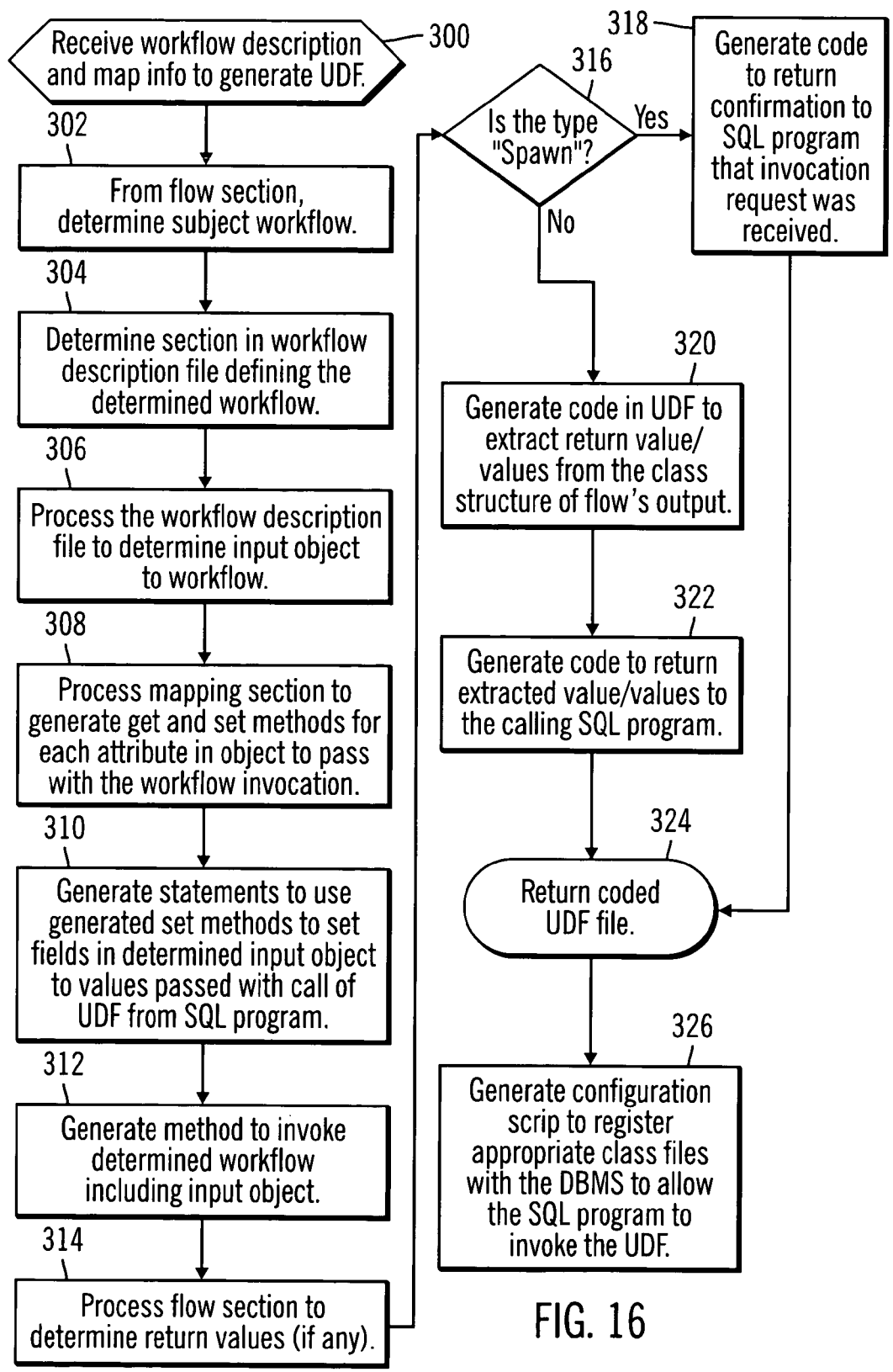
FIG. 16 illustrates logic to generate a UDF source file capable of invoking a workflow in accordance with implementations of the invention.

FIG. 16 illustrates logic implemented in the function generator 240 (FIG. 12) to generate a UDF source file 248, which may be compiled into an executable UDF 208*a*, 208*b* . . . 208*n*. Upon receiving (at block 300) a workflow description file 244 and map information 246 and invocation to generate a UDF file 248, the function generator 240 determines (at block 302) from the flow section 262 the name of the subject workflow 290 (FIG. 15). The function generator 240 then determines (at block 306) the section of the received workflow description file 244 that includes the definition of the subject workflow 290 and processes (at block 306) the determined section of the workflow description file 244 to determine the format of the input object(s) required by the subject workflow 220a, 220b . . . 20n (FIG. 12). The mapping section 260 (FIG. 13) is processed to generate (at block 308) the get and set methods for each attribute in the input object that will include input parameters passed from the SQL program 202. The function generator 240 then generates (at block 310) statements using the generated set methods to set fields in the determined input object with one or more values the SQL program 202 passes to the UDF 208a, 208b . . . 208n. The statement to invoke the subject workflow 220a, 220b . . . 220n is then added (at block 312) to the UDF file 248 being generated with the input object whose values were set to data passed from the SQL program 202.

The function generator 244 further processes (at block 314) the flow section to determine any return values 294, 296 (if any). If (at block 316) the type of the called workflow function in the function definition 292 is "spawn", then no values are returned and the function generator 244 generates (at block 318) a statement to return confirmation to the SQL program 202 that the flow request was received. In certain situations, a flow may execute asynchronously over a long period of time. For such flows, the workflow engine will asynchronously inform the calling UDF that the call was received, and the caller will not have to wait until the flow is completed. Otherwise, the function generator 244 generates (at block 320) code in UDF to extract return value/values from the class structure of the workflow's output. For instance, if the return data is of type "scalar" as indicated in the function field 292, then a single value is returned. If the type is "table", then a table is returned, and the function generator 244 will have to generate code in the UDF source file 248 to get the number of rows to return as indicated in the rows field 296. Code is further generated (at block 322) into the UDF file 248 to return any extracted value/values to the calling SQL program 202. After generating all the necessary code in the UDF file 248 to set values in an input object, invoke the workflow with the set input object, and extract any return values to return to the calling SQL program 202, the UDF source file 248 is returned (at block 324). The function generator 244 further generates an executable script file 250 that includes statements to register object oriented classes with the DBMS 204 that enable the SQL program 202 to call the UDFs 208a, 208b . . . 208n.

Figure 17:
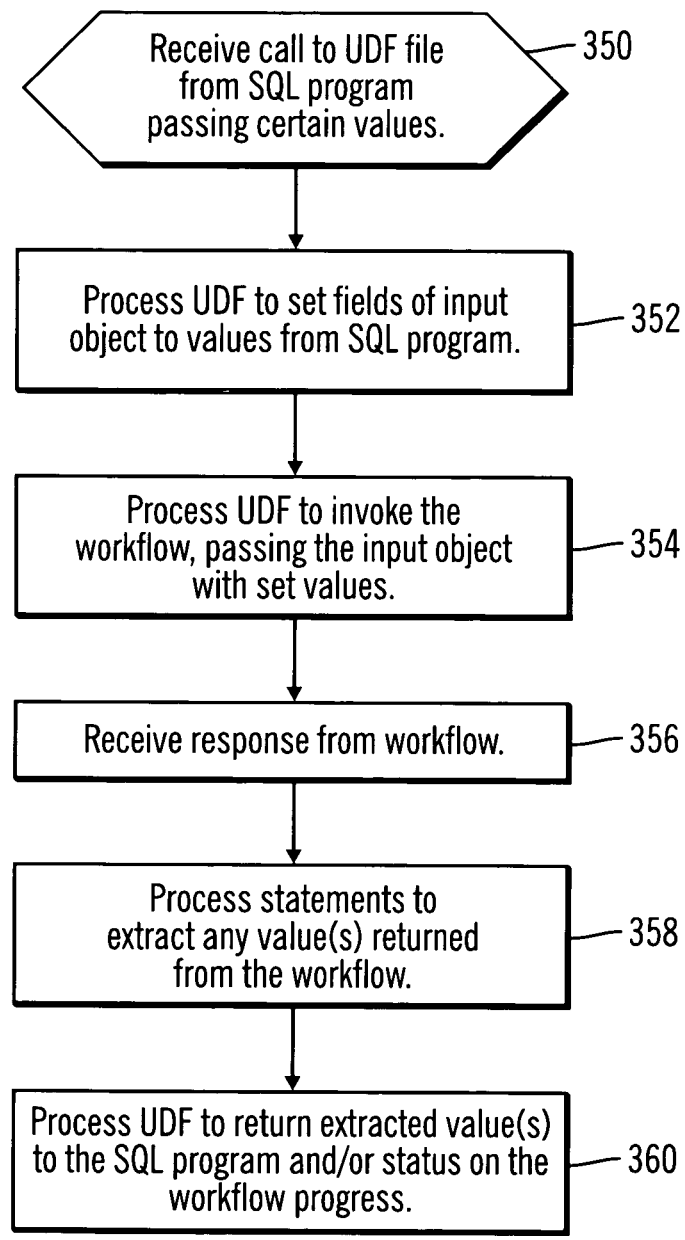
FIG. 17 illustrates logic to invoke a UDF in accordance with implementations of the invention.

An executable UDF 208a, 208b . . . 208n may be compiled from the generated UDF source file 248. The SQL program 202 may then call the executable UDFs 208a, 208b . . . 208n to cause the invocation of the external workflow 220a, 220b . . . 220n for which the UDF 208a, 208b . . . 208n is defined. FIG. 17 illustrates logic implemented by executing the UDFs 208a, 208b . . . 208n to invoke a workflow 220a, 220b . . . 220n in response to a call (at block 350) from the SQL program 202. As discussed, the SQL program 202 may make the call to the UDF 208a, 208b . . . 208n in response to a database event, such as a database trigger. Further, the executable script 250 would have been executed within the DBMS 204 to load any requisite classes to allow the SQL program 202 to call UDF 208a, 208b . . . 208n functions. The UDF 208a, 208b . . . 208n statements are executed to set (at block 352) values within the object(s) to pass to the invoked workflow 220a, 220b . . . 220n that include parameters passed with the call from the SQL program 202. The executed statements within the UDF 208a, 208b . . . 208n would then invoke (at block 354) the workflow 220a, 220b . . . 220n by transmitting a workflow function call to the workflow engine 210 with the input object including values set from parameters received from the SQL program 202. Upon receiving (at block 356) a response from the workflow, the UDF 208a, 208b . . . 208n would process (at block 358) the returned output to extract any value(s) returned from the workflow and return (at block 360) extracted value(s) or other information to the SQL program 202 that called the UDF 208a, 208b . . . 208n.

The described implementations provide a technique by which a database administrator can generate a UDF source file 248 whose executable form 208a, 208b . . . 208n is callable from a database program, such as SQL program 202, by providing a mapping information 246 and a workflow description file 244. In this way, the database administrator does not have to manually code UDFs. The executable UDFs compiled from the UDF source file 248 generated in the manner described herein may then be called from within an SQL program to enable the SQL program to invoke workflows to extend the operations that may be set in motion in response to a database event.

Additional Implementation Details

The described techniques for generating a program capable of invoking a workflow may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The workflow client and server may be implemented within any vendor workflow program known in the art.

In the described implementations, certain statements were described as implemented using the Java programming language. Alternatively, any programming language known in the art may be used to code any of the described program components.

In the described implementations, the generated UDFs were described as invoking one or more workflows within a workflow engine. The workflow generated may perform any type of operation, including internal business operations that involve the transmission of additional communications, via emails, facsimiles, phone calls with electronic voice messages, printer output sent via mail, etc. Further the workflows may cause any type of operation to initiate, whether such operation involves additional entry of data into a database.

The invoked operations may invoke automated manufacturing or other machine operations.

In certain described implementations, the mapping information provided to the function generator is used to generate a UDF capable of invoking a workflow. In alternative implementations, the UDF may be generated to invoke external operations other than workflows, such as Web Services or other flow of operations.

The mapping information was described as including a specific format, having a mapping section and flow section, each with specific components. In alternative implementations, the mapping information may be arranged in a data structure format different than that of the mapping information 206. Further, additional or different information may be included with the mapping information than described above.

In the described implementations, the UDFs were invoked by an SQL program. In alternative implementations, the UDFs may be invoked by applications other than a database application.

The illustrated logic of FIGS. 10, 16, and 17 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 18:
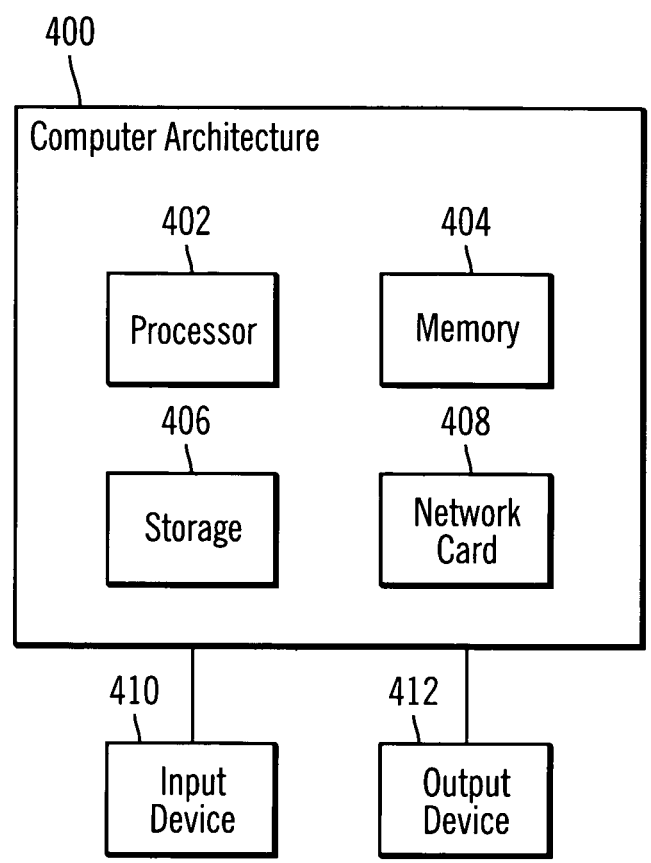
FIG. 18 illustrates one implementation of the computing architecture that may be used with the described implementations.

FIG. 18 illustrates one implementation of a computer architecture 400 that may be implemented within the computing environments and computing components described herein. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for generating a program that interacts in a computing environment including a workflow engine and an external database program, wherein the workflow engine implements a workflow of operations, wherein the workflow uses a runtime database to provide status and setup information for workflow process execution, and wherein the external database program performs operations with respect to an external database that is separate from the runtime database used by the workflow, comprising:

receiving, by the computer, as input a definition file defining the workflow of operations;

receiving, at the computer, as input mapping information defining input parameters to the workflow of operations;

processing, by the computer, the received definition file and mapping information to generate program statements within the program that when executed perform:

setting input parameters to the workflow of operations to values received from an external call to the program by the database program;

invoking the workflow of operations with the input parameters including values from the external call from the database program by transmitting a call to the workflow engine, wherein the workflow engine and the external database program are external to the program in the computing environment;

receiving output from the workflow of operations in response to the call to the workflow engine; and extracting at least one value from the received output to return to the database program that made the external call.

2. The method of claim 1, wherein the workflow of operations comprises Web services.

3. The method of claim 1, wherein the mapping information indicates methods used to set and retrieve input parameters to the workflow and information on output returned from the workflow.

4. The method of claim 3, wherein the program statements to set the input parameters include the methods indicated in the mapping information.

5. The method of claim 3, wherein the mapping information indicates a name of the workflow to invoke, and wherein the program statements to invoke the workflow of operations comprises a call to the name of the workflow indicated in the mapping information.

6. The method of claim 3, wherein the mapping information indicates return values from the workflow, and wherein the program statements to extract output from the received output includes program statements to extract return values indicated in the mapping information to return to the external call.

7. The method of claim 1, wherein the program including the generated statements comprises a User Defined Function (UDF) and wherein the database program includes Structured Query Language (SQL) statements, wherein the UDF is invoked within the SQL statements, and wherein the IDF translates the input parameters passed by the SQL program to the UDF to an input format of the workflow operations.

8. The method of claim 1, wherein the mapping information includes information to map values received from the database program of a database data type to the input parameters to the workflow of operations in a workflow data type used by the workflow of operations, and to map values in the workflow data type received from the workflow of operations to the database data type to return to the database program.

9. The method of claim 1, wherein at least one object oriented program class is required to call the program, further comprising:

generating a configuration script in response to processing the received definition file and mapping information to register the at least one required program class to enable the database program to make the external call to invoke the workflow of operations.

10. The method of claim 1, wherein the workflow and runtime database are included in a workflow engine, and wherein the definition file comprises the file used to generate a process template implemented in the runtime database in the workflow engine, wherein the process template includes a plurality of workflow tasks.

11. A computer method implemented in a program for invoking a workflow of operations in a workflow engine, wherein the workflow engine utilizes a runtime database for workflow process execution, comprising:
  receiving, by the computer executing the program, an external call, from a database program performing operations with respect to a database, to invoke the workflow, wherein the database program and the database are external to the workflow engine and the runtime database used by the workflow engine, and wherein the program is external to the workflow engine and the database program in a computing environment;
  invoking, by the computer executing the program, the workflow in response to the external call, by transmitting a workflow call to the workflow engine, wherein the runtime database provides status and setup information for workflow operations;
  receiving, by the computer executing the program, output from the workflow in response to the workflow call; and
  returning, by the computer executing the program, output from the workflow to the database program.

12. The method of claim 11, wherein the database program initiating the external call to invoke the workflow comprises at least one of a Structured Query Language (SQL) program or a database trigger initiating the external call in response to a database event.

13. The method of claim 11, wherein the received external call includes input parameters, wherein the workflow call to invoke the workflow includes workflow parameters including input parameters included with the external call.

14. The method of claim 13, further comprising:
  mapping the input parameters included with the external call to workflow input parameters included with the workflow call invoking the workflow.

15. The method of claim 11, wherein the operations of receiving the external call, invoking the workflow with the workflow call, receiving the output, and returning the output are performed by a User Defined Function (UDF), wherein the database program includes Structured Query Language (SQL) statements, wherein the UDF is invoked within the SQL statements, and wherein the IDF translates the input parameters passed by the SQL program to the UDF to an input format of the workflow operations.

16. A system for generating a program that interacts in a computing environment with an external database program and a workflow engine, wherein the workflow engine implements a workflow of operations, wherein the workflow uses a runtime database to provide status and setup information for workflow process execution, and wherein the external database program performs operations with respect to an external database that is separate from the runtime database used by the workflow, comprising:
  a processor complex; and
  a storage including a function generator program executed by the processor complex to cause operations, the operations comprising:
    receiving as input a definition file defining the workflow of operations;
    receiving as input mapping information defining input parameters to the workflow of operations;
    processing the received definition file and mapping information to generate program statements within the program that when executed perform:
      setting input parameters to the workflow of operations to values received from an external call to the program by the database program;
      invoking the workflow of operations with the input parameters including values from the external call from the database program by transmitting a call to the workflow engine, wherein the workflow engine and the external database program are external to the program in the computing environment; and
      receiving output from the workflow of operations in response to the call to the workflow engine; and
      extracting at least one value from the received output to return to the database program that made the external call.

17. The system of claim 16, wherein the mapping information indicates methods used to set and retrieve input parameters to the workflow and information on output returned from the workflow.

18. The system of claim 17, wherein the program statements to set the input parameters include the methods indicated in the mapping information.

19. The system of claim 17, wherein the mapping information indicates a name of the workflow to invoke, and wherein the program statements to invoke the workflow of operations comprises a call to the name of the workflow indicated in the mapping information.

20. The system of claim 17 wherein the mapping information indicates return values from the workflow, and wherein the program statements to extract output from the received output includes program statements to extract return values indicated in the mapping information to return to the external call.

21. The system of claim 16, wherein the program including the generated statements comprises a User Defined Function (UDF) and wherein the database program includes Structured Query Language (SQL) statements, wherein the UDF is invoked within the SQL statements, and wherein the IDF translates the input parameters passed by the SQL program to the UDF to an input format of the workflow operations.

22. The system of claim 16, wherein the mapping information includes information to map values received from the database program of a database data type to the input parameters to the workflow of operations in a workflow data type used by the workflow of operations, and to map values in the workflow data type received from the workflow of operations to the database data type to return to the database program.

23. The system of claim 16, wherein the workflow and runtime database are included in a workflow engine, and wherein the definition file comprises the file used to generate a process template implemented in the runtime database in the workflow engine, wherein the process template includes a plurality of workflow tasks.

24. A system that interacts in a computing environment including a workflow engine and an external database program, wherein the workflow engine utilizes a runtime database for workflow process execution, and wherein the runtime database provides information on workflow operations of a workflow including status and setup information for workflow process execution, and wherein the external database program performs operations with respect to an external database that is separate from the runtime database used by the workflow, comprising:

a processor; and a computer readable storage medium including a program external to the workflow engine and the external database in the computing environment, wherein the program is executed by the processor to perform:

receiving an external call, from the database program to invoke the workflow, wherein the database program and the database are external to the workflow engine and the runtime database used by the workflow engine;

invoking the workflow in response to the external call, by transmitting a workflow call to the workflow engine;

receiving output from the workflow in response to the workflow call; and returning output from the workflow to the database program.

25. The system of claim 24, wherein the database program initiating the workflow call to invoke the workflow comprises at least one of a Structured Query Language (SQL) program or a database trigger initiating the external call in response to a database event.

26. The system of claim 24, wherein the received external call includes input parameters, wherein the workflow is invoked with workflow parameters including input parameters included with the external call.

27. The system of claim 24, wherein the operations of receiving the external call, invoking the workflow with the workflow call, receiving the output, and returning the output are performed by a User Defined Function (UDF), wherein the database program includes Structured Query Language (SQL) statements, wherein the UDF is invoked within the SQL statements, and wherein the IDF translates the input parameters passed by the SQL program to the UDF to an input format of the workflow operations.

28. An article of manufacture comprising a computer readable storage medium including code executed to generate a program that interacts in a computing environment including a workflow engine and an external database program, wherein the workflow engine implements a workflow of operations, wherein the workflow uses a runtime database to provide status and setup information for workflow process execution, and wherein the external database program performs operations with respect to an external database that is separate from the runtime database used by the workflow, wherein the code is executed to cause operations, the operations comprising:

receiving as input a definition file defining the workflow of operations;

receiving as input mapping information defining input parameters to the workflow of operations;

processing the received definition file and mapping information to generate program statements within the program that when executed perform:

setting input parameters to the workflow of operations to values received from an external call to the program by the database program;

invoking the workflow of operations with the input parameters including values from the external call from the database program by transmitting a call to the workflow engine, wherein the workflow engine and the external database program are external to the program in the computing environment;

receiving output from the workflow of operations in response to the call to the workflow engine; and extracting at least one value from the received output to return to the database program that made the external call.

29. The article of manufacture of claim 28, wherein the mapping information indicates methods used to set and retrieve input parameters to the workflow and information on output returned from the workflow.

30. The article of manufacture of claim 29, wherein the program statements to set the input parameters include the methods indicated in the mapping information.

31. The article of manufacture of claim 29, wherein the mapping information indicates a name of the workflow to invoke, and wherein the program statements to invoke the workflow of operations comprises a call to the name of the workflow indicated in the mapping information.

32. The article of manufacture of claim 29 wherein the mapping information indicates return values from the workflow, and wherein the program statements to extract output from the received output includes program statements to extract return values indicated in the mapping information to return to the external call.

33. The article of manufacture of claim 28, wherein the program including the generated statements comprises a User Defined Function (UDF) and wherein the database program includes Structured Query Language (SQL) statements, wherein the UDF is invoked within the SQL statements, and wherein the IDF translates the input parameters passed by the SQL program to the UDF to an input format of the workflow operations.

34. The article of manufacture of claim 28, wherein the mapping information includes information to map values received from the database program of a database data type to the input parameters to the workflow of operations in a workflow data type used by the workflow of operations, and to map values in the workflow data type received from the workflow of operations to the database data type to return to the database program.

35. The article of manufacture of claim 28, wherein the workflow and runtime database are included in a workflow engine, and wherein the definition file comprises the file used to generate a process template implemented in the runtime database in the workflow engine, wherein the process template includes a plurality of workflow tasks.

36. The article of manufacture of claim 28, wherein the input mapping information includes a flow section indicating a workflow function and whether the workflow function is scalar, a table or executes the flow asynchronously and returns indicating values to be returned by the invoked workflow function.

37. An article of manufacture comprising a computer readable storage medium including a program that is executed to interact in a computing environment including a workflow engine and an external database program, wherein the workflow engine implements a workflow of operations, wherein the workflow engine uses a runtime database to provide status and setup information for workflow process execution, and wherein the external database program performs operations with respect to a database, wherein the program is further executed to perform operations, the operations comprising:

receiving an external call, from the external database program to invoke the workflow, wherein the external database program and the database are external to the workflow engine and the runtime database used by the workflow engine, wherein the program is external to the workflow engine and the external database in the computing environment;

invoking the workflow in response to the external call by transmitting a workflow call to the workflow engine;

receiving output from the workflow in response to the workflow call; and returning output from the workflow to the database program.

38. The article of manufacture of claim 37, wherein the database program initiating the external call to invoke the workflow comprises at least one of a Structured Query Language (SQL) program or a database trigger initiating the external call in response to a database event.

39. The article of manufacture of claim 37, wherein the received external call includes input parameters, wherein the workflow call to invoke the workflow includes workflow parameters including input parameters included with the external call.

40. The article of manufacture of claim 37, wherein the operations of receiving the external call, invoking the workflow with the workflow call, receiving the output, and returning the output are performed by a User Defined Function (UDF), wherein the database program includes Structured Query Language (SQL) statements, wherein the UDF is invoked within the SQL statements, and wherein the IDF translates the input parameters passed by the SQL program to the UDF to an input format of the workflow operations.

* * * * *